Figure 2A:
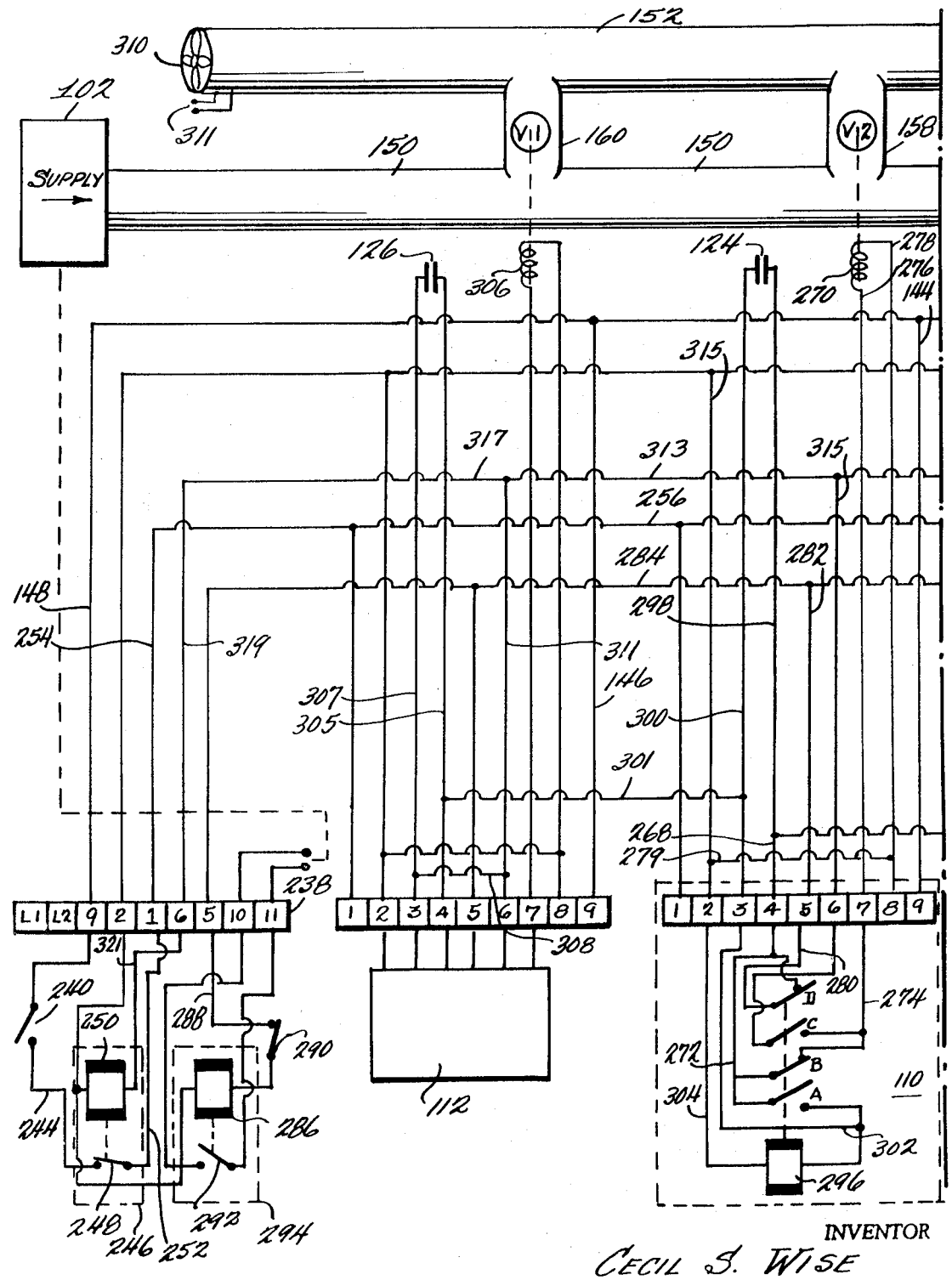

United States Patent

Wise

[15] 3,649,082

[45] Mar. 14, 1972

[54] MULTIPLE SOURCE MATERIAL DISTRIBUTING SYSTEM

[72] Inventor: Cecil S. Wise, Dallas, N.C.

[73] Assignee: Fiber Controls Corporation, Gastonia, N.C.

[22] Filed: Jan. 26, 1970

[21] Appl. No.: 5,981

Related U.S. Application Data

[63] Continuation of Ser. No. 694,268, Dec. 28, 1967, abandoned, Continuation-in-part of Ser. No. 538,437, Mar. 3, 1966, abandoned, Continuation-in-part of Ser. No. 444,885, Mar. 2, 1965, abandoned, Continuation-in-part of Ser. No. 217,154, Aug. 15, 1962, abandoned, Continuation-in-part of Ser. No. 561,575, June 29, 1966, abandoned.

[52] U.S. Cl. .................................302/27, 19/105, 302/28
[51] Int. Cl. .................................B65g 53/04, B65g 53/36
[58] Field of Search ..................................19/105, 105 CF; 302/11–13, 27, 28, 39, 42, 41

[56] References Cited

UNITED STATES PATENTS

| 111,615 | 2/1871 | Crampton | 302/13 |
|---|---|---|---|
| 1,724,309 | 8/1929 | Pigott | 302/28 |
| 2,140,128 | 12/1938 | Craggs | 302/28 |
| 2,774,516 | 12/1956 | Jensen | 302/284 |
| 3,414,330 | 12/1968 | Trutzschler | 302/28 |

*Primary Examiner*—Evon C. Blunk
*Assistant Examiner*—W. Scott Carson
*Attorney*—Cushman, Darby & Cushman

[57] ABSTRACT

Method and apparatus for distributing material from a plurality of sources to a plurality of stations via a conveyor which connects at least one of these stations to each of the sources, the disclosed in conjunction with the selection by a variety of types of switches of a desired number of the stations to be fed by the sources, respectively, in such a manner that only one source can be used at a time to feed a given station.

43 Claims, 12 Drawing Figures

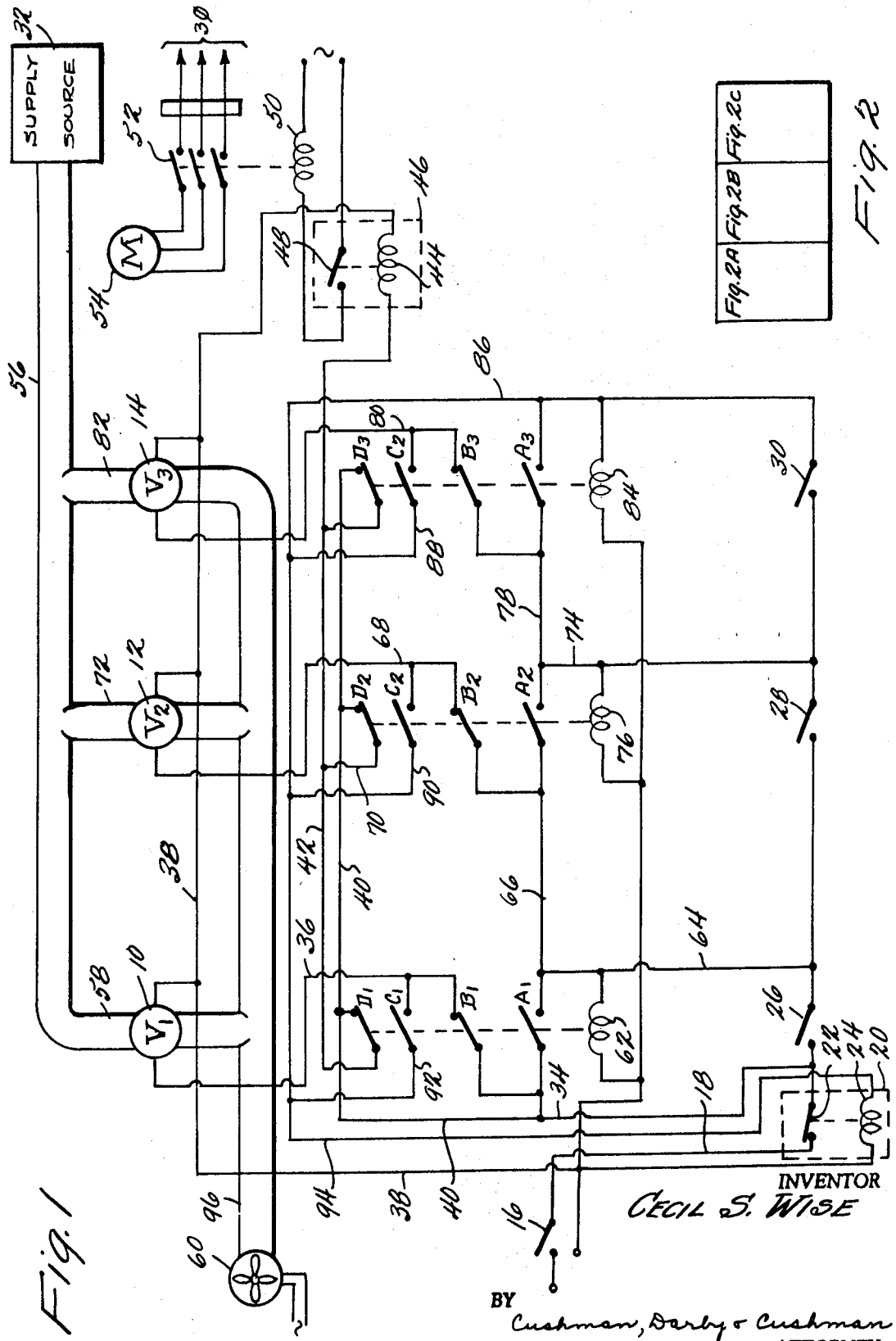

INVENTOR
CECIL S. WISE

INVENTOR
CECIL S. WISE

INVENTOR
CECIL S. WISE

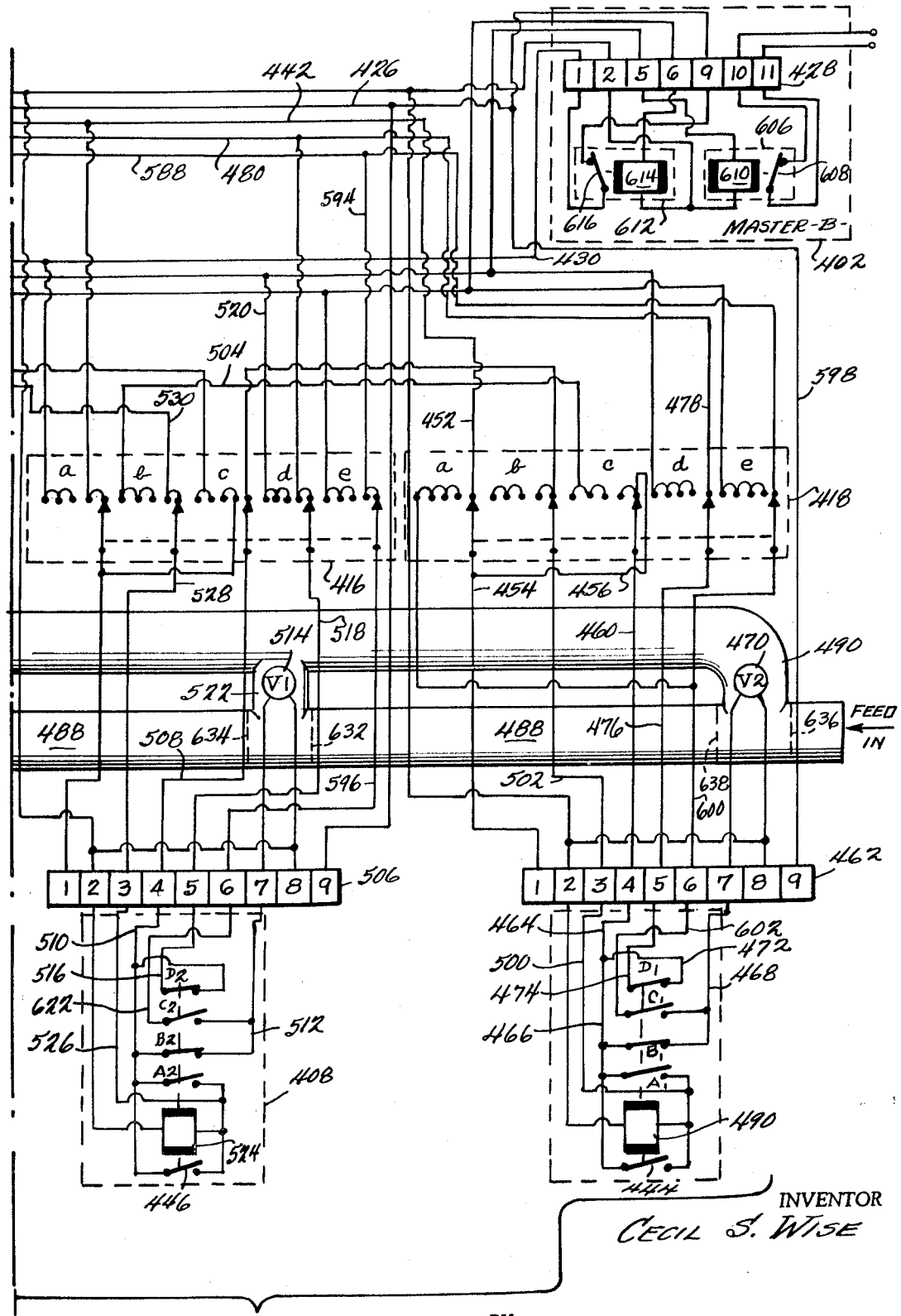

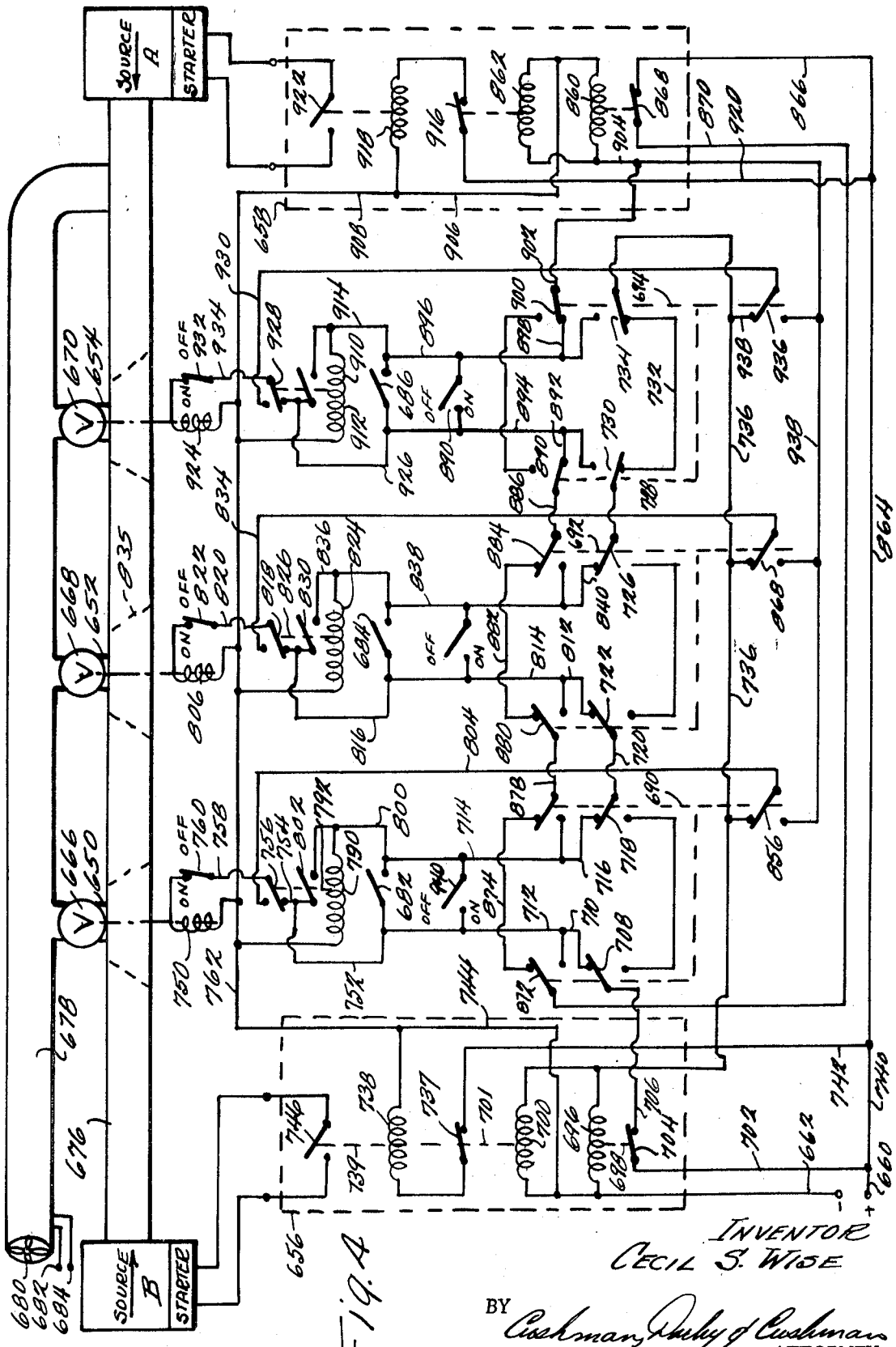

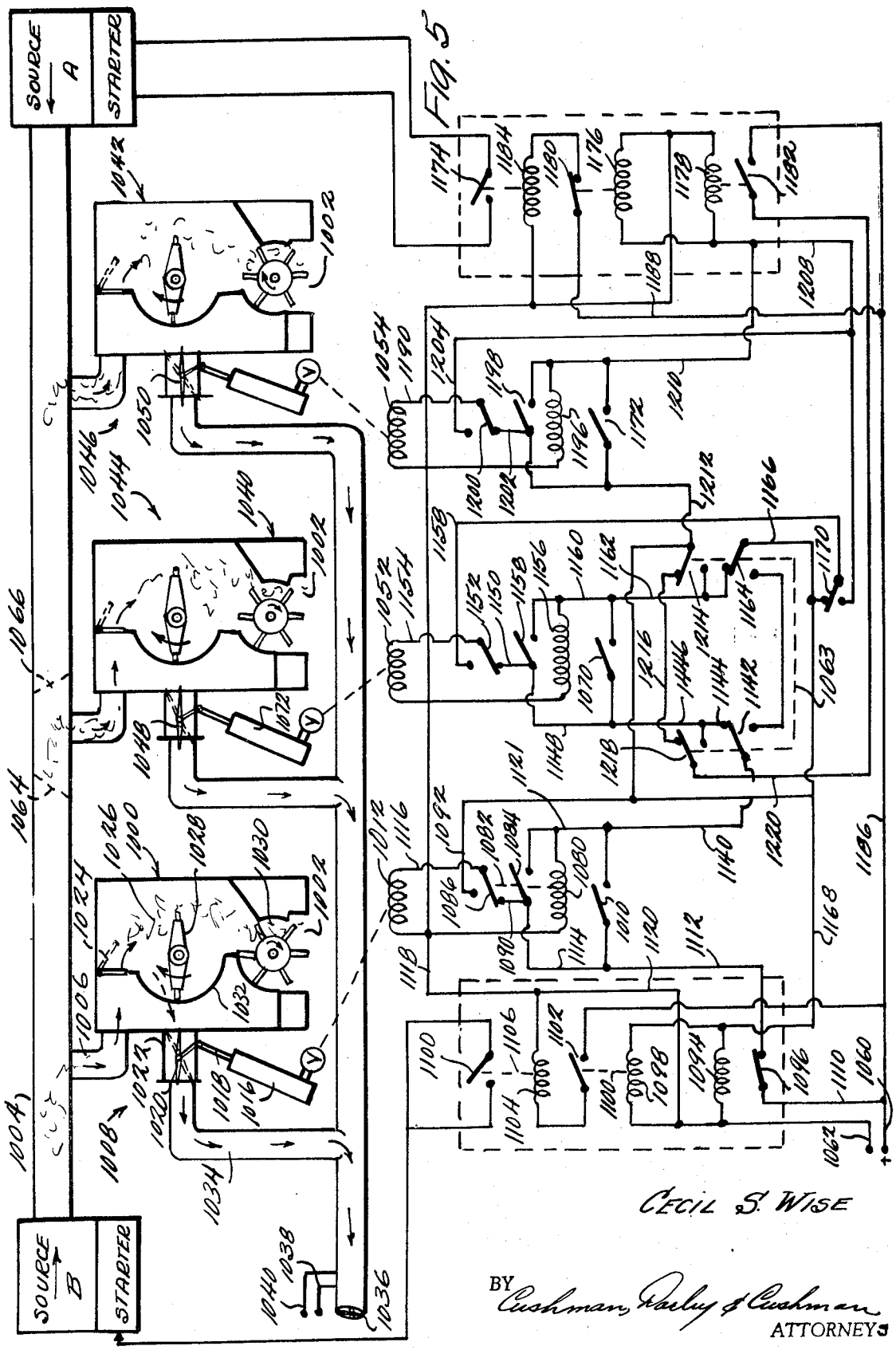

INVENTOR
CECIL S. WISE

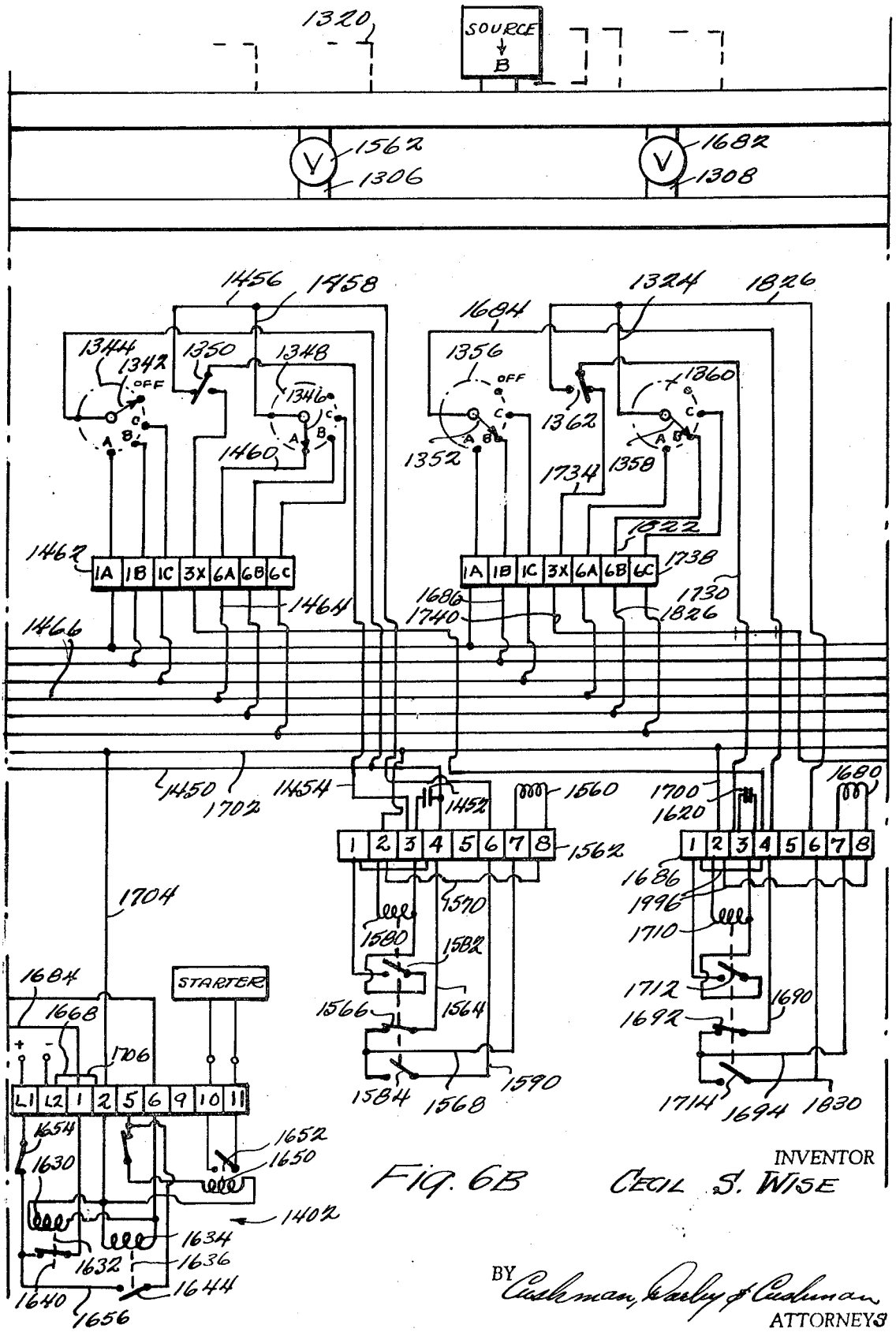

MULTIPLE SOURCE MATERIAL DISTRIBUTING SYSTEM

This application is a streamline continuation of application, Ser. No. 694,268, filed Dec. 28, 1967, now abandoned, which is a continuation in part of application Ser. No. 538,437 filed on Mar. 3, 1966, now abandoned; of application, Ser. No. 444,885, filed on Mar. 2, 1965, now abandoned; of application, Ser. No. 217,154 filed on Aug. 15, 1962, now abandoned; and also of application, Ser. No. 561,575 filed June 29, 1966, which is also now abandoned.

This invention relates to a distributor system, and more particularly to the electrical control system in a system for distributing material, for example, of the type that may be conveyed by a stream of fluid, such as air, to any one of a plurality of stations that demands material. Specifically, the invention relates to feeding from a plurality of sources generally concurrently and variably to different stations according to which source is selected to feed which station or stations.

The type of material with which this invention may conveniently be employed is such as may be found in textile mills, for example, any type of fibers or fibrous material such as cotton, rayon and dacron; but no limitation to such materials is intended. Any other material which is desired to be distributed by the system could be conveniently done. And any material which can be conveyed by a stream of fluid, such as air, may also be conveniently distributed by this type of system. Basically, however, this invention is not limited to a vacuum or other type fluid conveyor.

In textile mills, for example, there are many instances in which it is deemed necessary to convey fibers from one processing system to another, and this is generally accomplished by entraining the fibers in an air stream. In order to separate the fibers from the air stream at the point of delivery, a distributor transition valve apparatus conveniently termed a "fiber condensor" is employed. A condenser of this general type is described and claimed in the Lytton et al. U.S. Pat. No. 3,039,149. A plurality of such condensers or of other types of material separators or distributors may be disposed at respective receiving points or stations where it is desired to distribute the fibers in accordance with the needs of a particular station. In such a condenser or distributor transition valve, there is an air intake channel and a discharge channel, along with a fiber outlet to a hopper, or the like, at the respective station, and a transition valve for extracting the air and material from the intake channel and separating them to the air discharge channel and fiber outlet respectively when the particular station requires material. The inlet and discharge channels of each of the distributors are connected to an air system, and the arrangement is such that if the valve is not actuated, the material in the stream of air, as it arrives at the actuated station, passes that station and proceeds to the next. Each station includes a means for sensing the material requirements of that station, and each station may be sequentially and selectively coupled to an electrical system which actuates the transition valve of the respective station or not in accordance with the instantaneous determination of the sensing system required therein. The operation of one type of transition valve is discussed in connection with FIG. 5.

This invention is a particular improvement over the invention disclosed in the Wise application, Ser. No. 538,437 which discloses and claims the system as described in the above paragraphs. The system which is disclosed and claimed in the application improves the versatility of the distributing system as described below.

In all systems prior to the present invention, only one material supply source has been used. In such a distributing system, one supply source would feed the respective stations thereof, but the use of only one supply source was restrictive in the industry.

The system disclosed by this invention allows a distributing system to use two or more material sources, whether the sources are close or quite remote relative to each other. In any event, the material from the sources can be distributed to a number of preselected stations connected to the distributing line. The material sources are connected in such a manner that both can distribute their respective materials concurrently to those preselected stations which are demanding material from the respective sources, with any one station being fed at any one time by just one source. According to the invention, the material can be distributed not only according to the demand of each station but also to a number of stations demanding a particular material from the respective supply source which contains that material. The system displays a versatility which heretofore was unavailable in the industry.

It will also be apparent hereinbelow that the system can perform automatically the selection of a predetermined number of stations which are to be fed from the respective material sources so that only one material source is selected to feed any given station.

It is accordingly the primary object of this invention to distribute material from more than one material source to a selected respective number of different receiving stations.

Another object of this invention in conjunction with the foregoing object, is to convey material from concurrently two different sources, which may or may not supply the same type or kind of material to the stations with any one station being fed by just one source.

Another and still further object of the invention is to render additional versatility of a distributing system thereby improving the quantity and quality of the distribution operation which was heretofore unavailable in the industry.

A still further object of the invention is to allow the preselection of a number of stations along a distributing line to be performed automatically.

These and other objects of the present invention will become more apparent during the course of the following detailed description and appended claims.

Figure 2B:
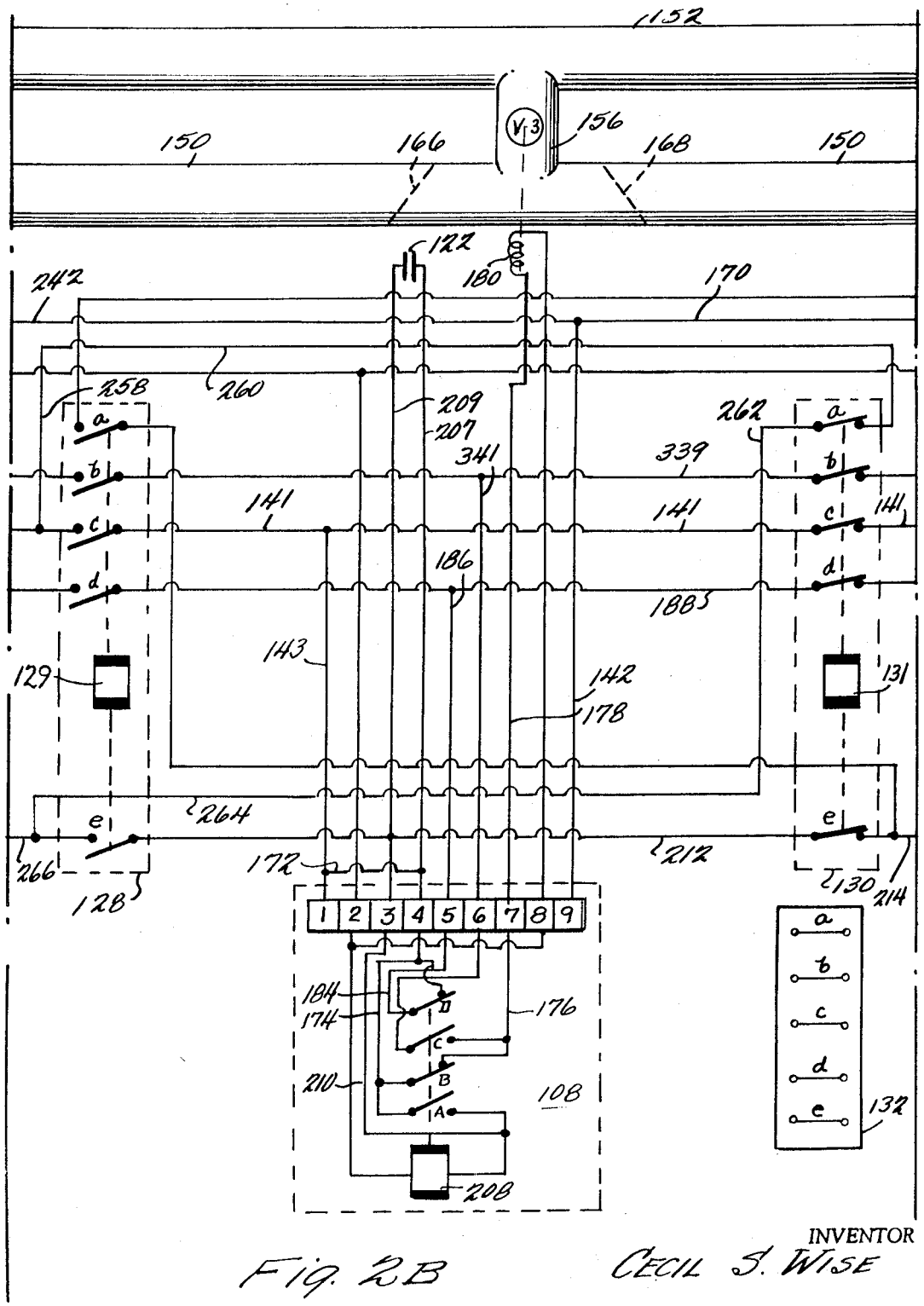
Figure 2C:
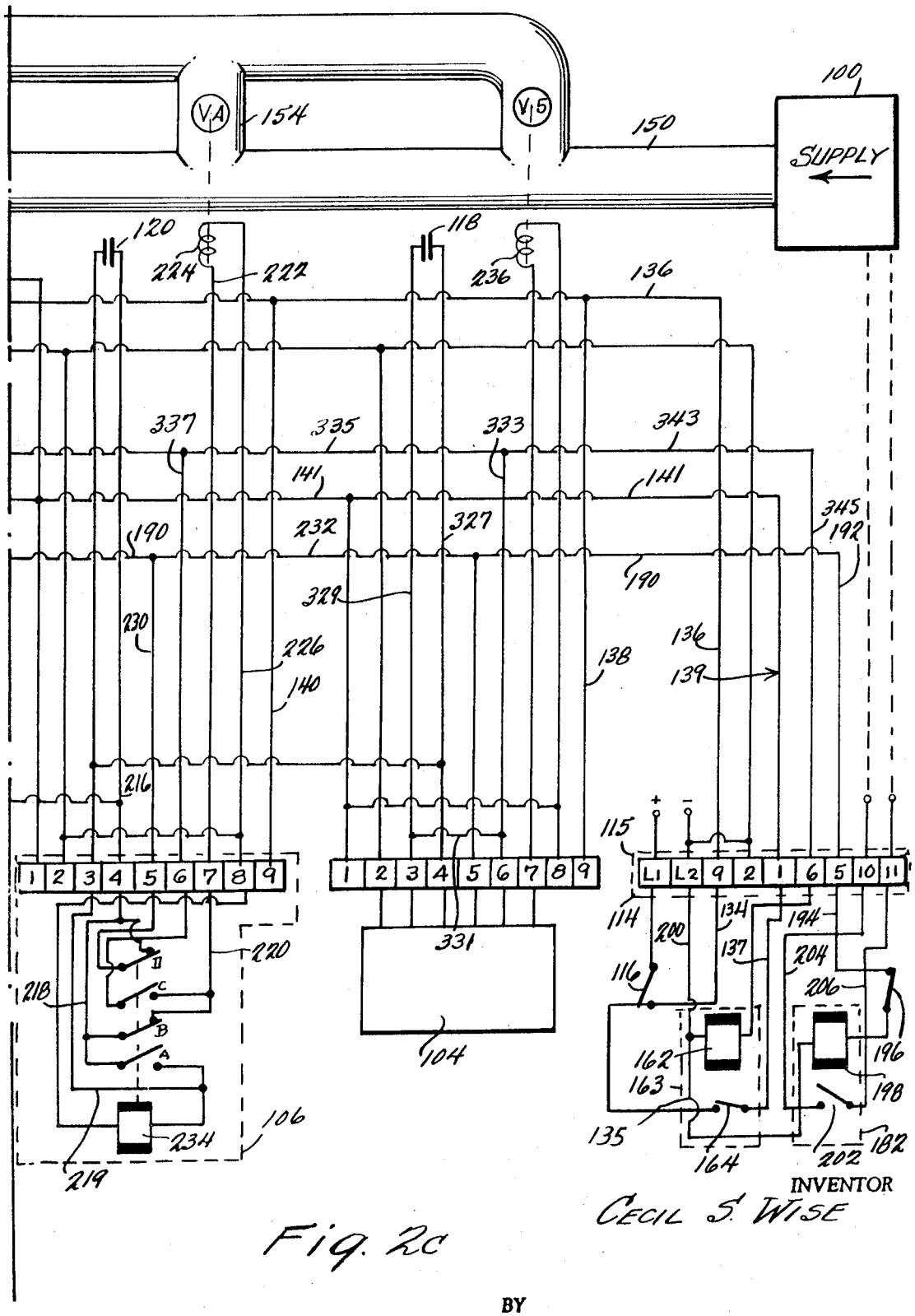
Figure 3A:
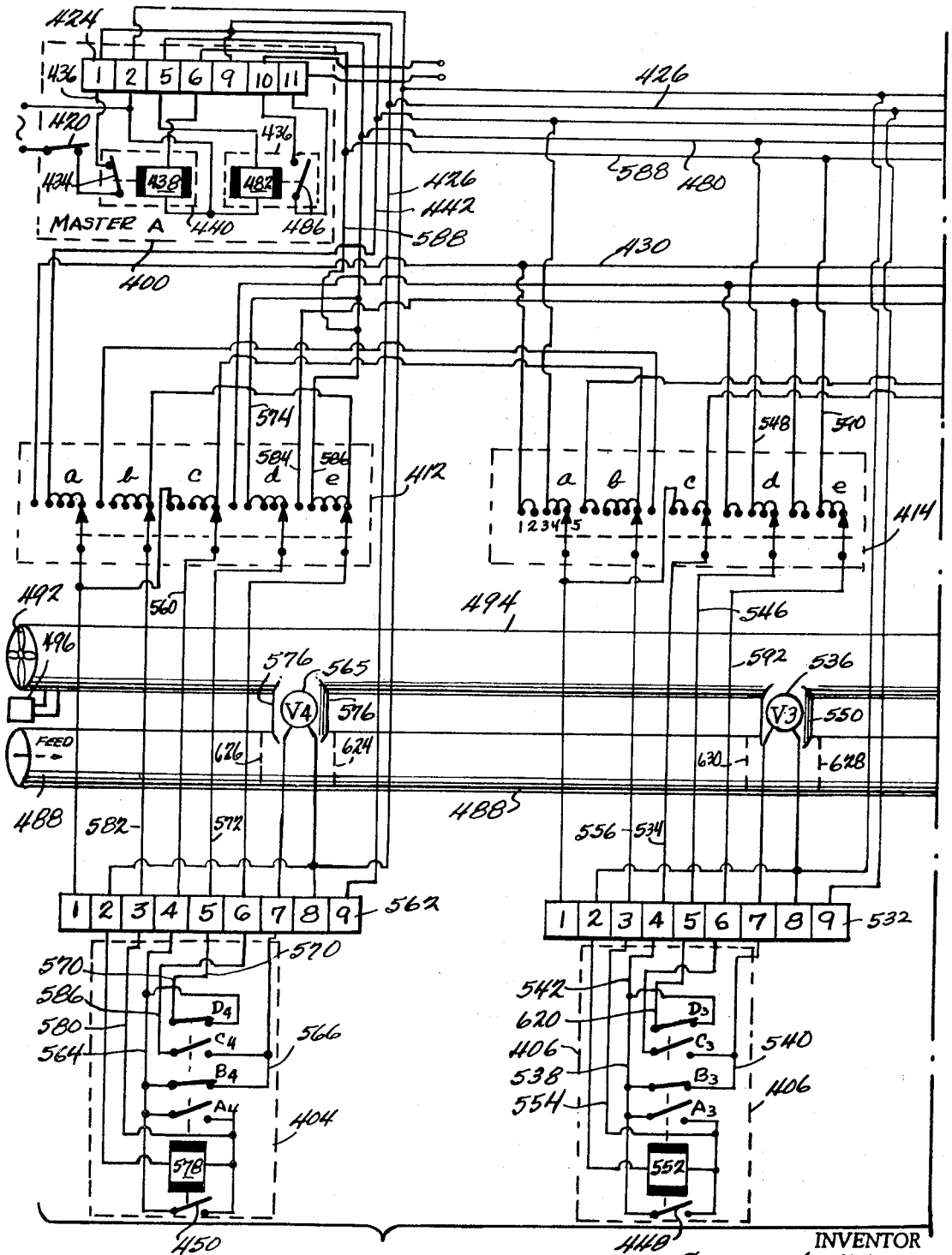

The invention may best be understood with reference to the accompanying drawings, in which:

FIG. 1 is a schematic and diagrammatic illustration of a system which selectively and sequentially feeds material from one source material;

FIG. 2, consisting of FIGS. 2A, 2B and 2C, is a schematic illustration of the subject invention wherein material from two sources is distributed to a number of stations;

FIG. 3, consisting of FIGS. 3A and 3B, is a schematic illustration of another embodiment of the electrical control system of this invention for distributing material from two sources to a number of stations;

FIG. 4 is a schematic illustration of another embodiment of the electrical control system of this invention for distributing material from two sources to a number of stations wherein the source which feeds each station can be changed by changing the position of a ganged switch.

Figure 6A:
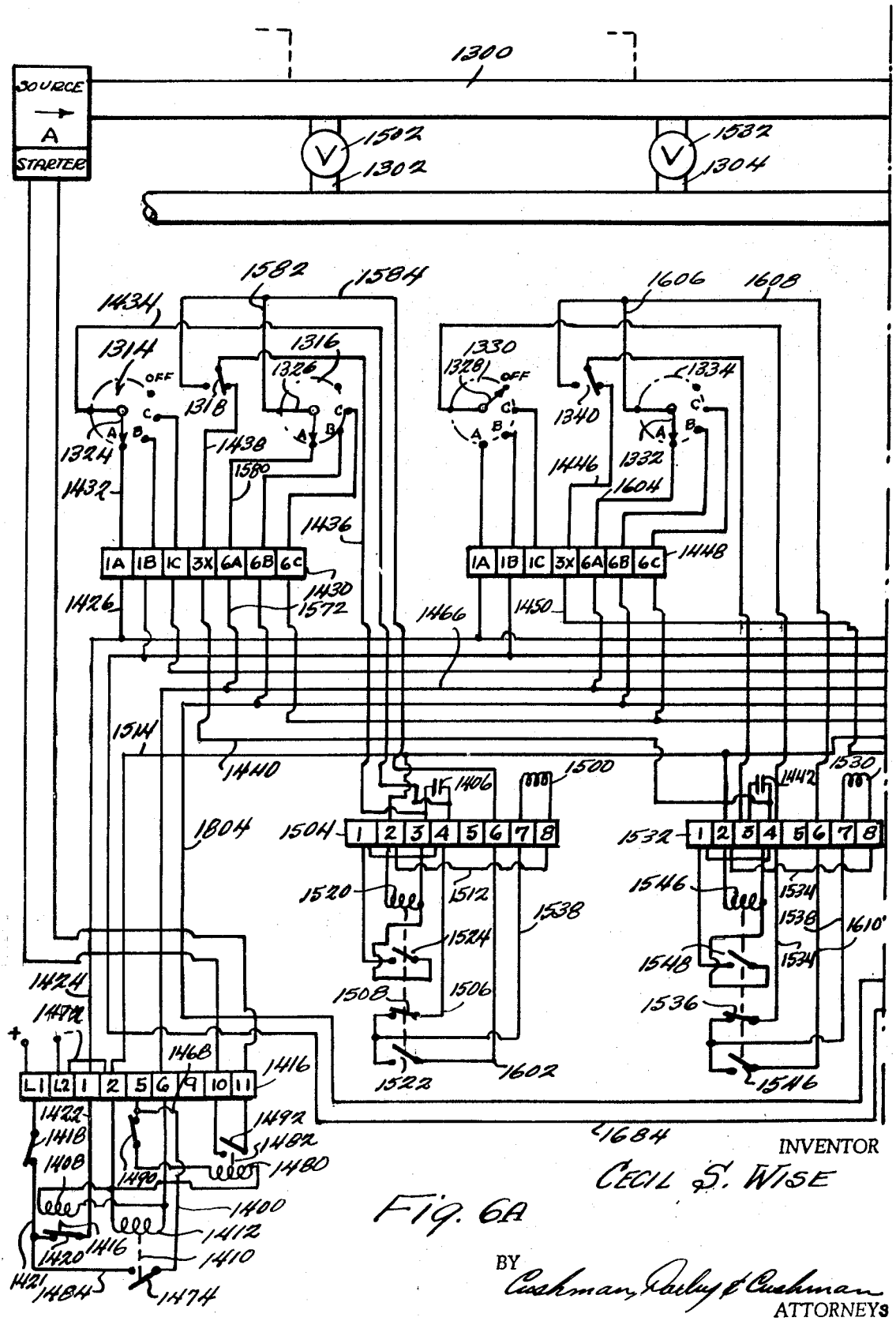
Figure 6C:
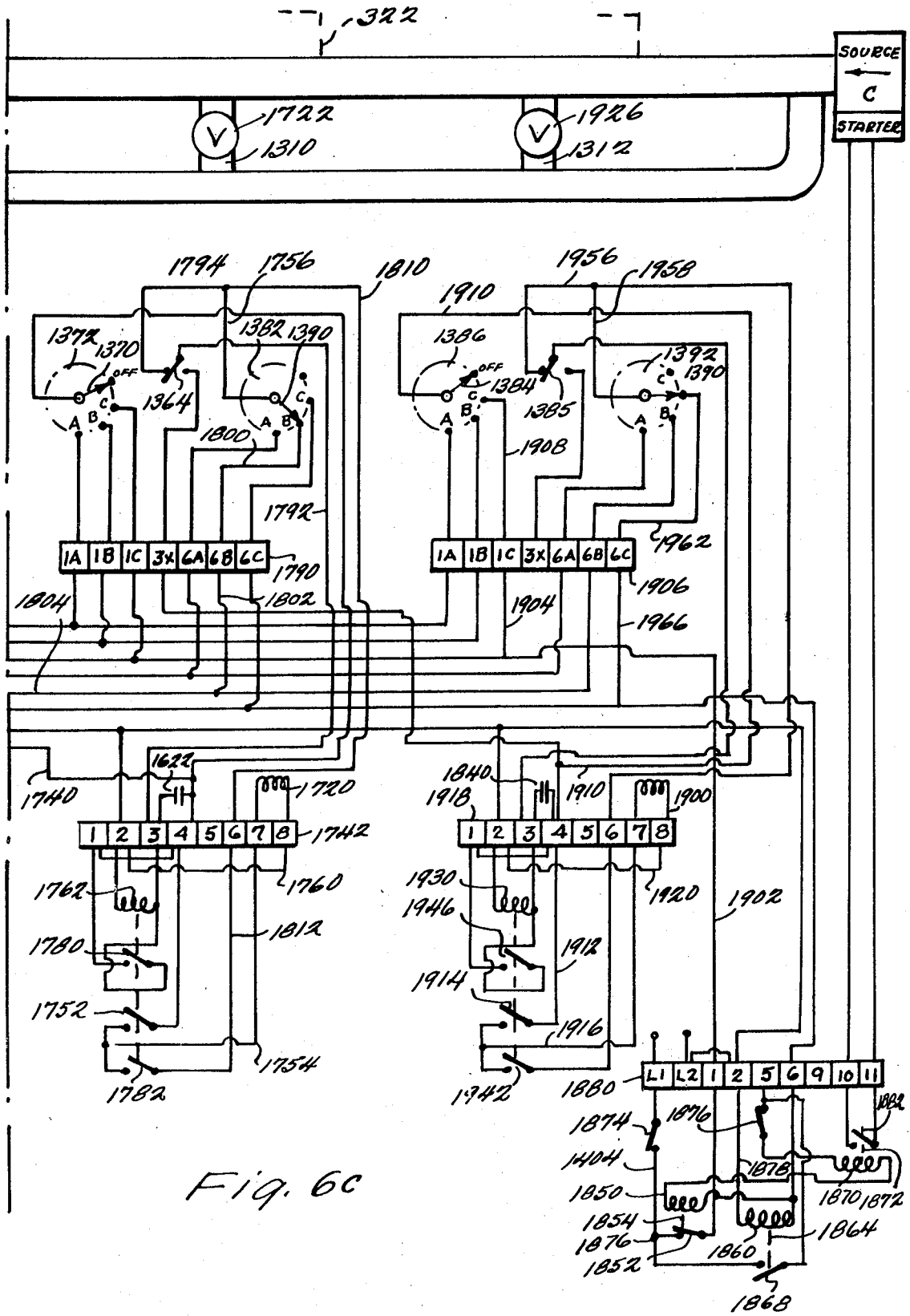

FIG. 5 is a schematic illustration of another embodiment of the electrical control system of this invention for distributing material from two sources to a number of stations wherein some of the stations are adapted to be fed from either source; and FIG. 6, consisting of FIGS. 6A, 6B and 6C, is a schematic illustration of another embodiment of the electrical control system of this invention for distributing material from three sources to a number of stations.

Before proceeding with a description of the electrical control system and selective distribution arrangement of the subject invention, reference is made first to the system which distributes from only one material supply source which is disclosed and claimed in the C.S. Wise application, Ser. No. 538,437 of which this is a continuation in part. This description is made so that the subject invention will be clearer and more readily understood.

Reference is now made to FIG. 1 wherein a distributing system is shown which specifically distributes material from one source to three receiving stations located at the vacuum conduit locations delineated as $V_1$, $V_2$ and $V_3$. These transition valves or "fiber condensers" are also indicated by numerals 10, 12, and 14. They are normally closed, but open when a demand is indicated by the receiving station at which they are located. These transition valves or fiber condensers are used to separate fibers of the material from the conveying air stream at the point of delivery. A plurality of such transition valves or condensers, or other types of material separators as shown in the Lytton et al. U.S. Pat. No. 3,039,151 and described in connection with FIG. 5, heretofore mentioned, are disposed at respective receiving points or stations where the material is to be distributed in accordance with the demand signal which is being generated from a particular station. The circuit diagram controlling these transition valves is now specifically explained.

With the system initially at rest, master control switch 16 is closed and it energizes power line 18. The pneumatic timer 20, which includes switch 22, which is normally closed, and coil 24 does not affect the operation of the system until the recycling sequence in the distribution operation as discussed infra.

Switches 26, 28, and 30, are level control switches and are located within the respective receiving stations of the distributing system. These switches 26, 28, and 30 effectively operate to generate a demand or no demand signal for their respective receiving stations. They are normally open and are closed only when the level of the material within the station indicates that the particular station is filled and no longer needs any material to fulfill its demand requirements. Assuming for the moment, that all the level control switches 26, 28 and 30 are open, indicating a demand at all the stations, line 18 is energized when switch 16 is closed. The open condition of level control switch 26, as previously assumed, indicates that the first station in the line and the furthest away from the supply source 32 is demanding material. With the energization of line 18 and switch 26 being open, line 34 is energized since switch 22 is normally closed. The power is transmitted to transition valve 10 through lines 34, 36 since relay contact $B_1$ is normally closed. The circuit is completed through return line 38. Line 34 concurrently energizes line 40 and 47 through the normally closed relay contact $D_1$. with the energization of line 42, coil 44 of feed timer 46 is energized. Coil 44 is a time delay type coil which becomes fully energized after a lapse of a few seconds. This circuit is also completed through line 38. The feed time closes switch 48 after a definite time delay, usually in the range of five seconds. This delay time period is interjected in the circuit to assure that material supply from source 32 is ready to be distributed.

When switch 48 closes, coil 50 is energized, which in turn closes three phase switch 52, thereby energizing motor 54 which begins the flow of material to conduits 56 and 58 from supply source 32. Transition valve 10, being open, is now capable of transmitting the received supply of material to its respective receiving station. The flow of material from supply source 32 through conduits 56 and 58 is caused by the vacuum created through fan 60. The fan 60 can be electrically connected to the primary circuit, so that when switch 22 opens, thereby closing the system, it also concurrently stops the fan; or the fan 60 can be continuously operated as shown through a separate power source and shut off only when the system is completely shut down by the opening of master control switch 16.

When the first station is filled, the level control switch 26 closes, energizing thereby coil 62 through line 64. With the energization of coil 62, relay contacts $B_1$ and $D_1$, which are normally closed, are now opened, thereby deenergizing coil 44, opening switch 48 and stopping feed motor 54. When relay contacts $B_1$ and $D_1$ are opened, relay contacts $A_1$ and $C_1$, which were normally opened, are now closed. The closing of relay contact $A_1$ allows power from line 34 to be transmitted to line 66 and through relay contact $B_2$, which is normally closed, to line 68, thereby opening transition valve 12. Concurrently, power from line 34 flows through line 40, to normally closed relay contact $D_2$ to line 70 and 42, once again energizing coil 44, thereby instituting a delay factor in the feed supply distribution. At the end of this delay period, switch 48 is closed in turn closing three phase switch 52, energizing motor 54, and thereby feeding a supply of material from supply source 32 to conduits 56 and 72. When the material is conveyed through conduit 72, and since the transition valve 12 is open material is deposited through the transition valve 12 into its respective receiving station.

When the level control switch 28 indicates that the particular related station no longer needs any material, it closes, thereby completing a circuit through lines 18 and 74, and energizing relay coil 76, whereupon relay contacts $D_2$ and $B_2$, which are normally closed, are opened. The opening of normally closed contacts $D_2$ and $B_2$ closes transition valve 12 and deenergizes coil 44 thereby opening three phase switch 52 and stopping the feed motor 54. Relay contacts $A_2$ and $C_2$ which are normally opened, are now closed. As it had been previously assumed, level control switch 30 was open and it remains open indicating a demand at its respective station. This demand is now fulfilled, since the closing of relay contact $A_2$ transmits power to line 78, through normally closed relay contact $B_3$ and line 80, thereby opening transition valve 14. At the same time, power is transmitted to the feed supply circuit through lines 34, 40, through normally closed relay contact $D_3$ to line 42. This energizes coil 50, closing three phase switch 52 and starting feed motor 54 which feeds the material through conduits 56 and 82 into the respective receiving station which is fed by transition valve 14.

It is apparent from this specification that the transition valves 10, 12 and 14 are operably actuated when the level control switches 26, 28, and 30 are closed thereby indicating demand at each respective receiving station. The station demand requirement is fulfilled in the system shown by FIG. 1, by first filling the station furthest away from the supply source 32, then sequentially filling the remaining stations, from the furthest in the distribution line to the nearest to the supply source 32. This sequence is established so that the conduits 58, 72, 82 and 56 can be substantially clear of residue material during the operable distributing time of the system. By using this sequence any material residue which remains in conduit 56 during the filling of the first station can be used to fulfill the demand of the second station, thereby limiting the amount of residue material remaining in the conduits which has to be purged therefrom during the purging operation to be described infra.

Upon completion of the filling operation, level control switch 30 is closed thereby energizing relay coil 84. The relay contacts $B_3$ and $D_3$ which are normally closed are now opened, and relay contacts $A_3$ and $C_3$ which are normally open are now closed. With the closing of relay contact $A_3$, power is transmitted to all the relays 62, 76 and 84 through lines 34, 66 and 78 thereby assuring that the relay windings 62, 76 and 84 remain energized even though a level control switch may at this time be open indicating a demand condition at that particular station. Concurrently with the closing of relay contact $A_3$ power flows through line 86, transmitting power to lines 88, 90 and 92, and due to the fact that relay contacts $C_1$, $C_2$ and $C_3$ are closed the transition valves 10, 12 and 14 connected thereto through lines 36, 68 and 80 are opened.

The opening of all the transition valves 10, 12 and 14 at this time insures that any residue material which remains in the conduits 56, 58, 72 and 82 from the distributing operation is cleared by drawing it into the nearest receiving station. It is seen then that upon completion of the distribution cycle the conduits are automatically purged of any residue material which may remain therein during the distributing operation. The duration of this purging operation is controlled by the pneumatic timer 20 since the energization of line 86 transmits power to coil 24 of the pneumatic timer 20 through line 94. When coil 24 is energized it opens the normally closed switch 22, thereby cutting off all power to the system.

The opening of the transition valves 10, 12 and 14 during the purging operation allowing the residue material to be transmitted into the nearest receiving station is also a safety feature, since the fan 60 is continuously drawing out and creating a vacuum within the conduits 56, 58, 72, 82 and 96. The vacuum so created if allowed to continue for an extended period of time without any relief would eventually collapse the conduits. The feed motor 54 is precluded after completion of the feeding and distributing operation and it does not commence feeding the stations again until the conduits are purged and the complete operation is recycled. It is during this interim period that the conduits may collapse, however, the invention eliminates this detrimental feature by opening the transition valves 10, 12 and 14 thereby not only purging the conduits of residue material but also preventing the collapse of the conduits.

The fan 60 can be electrically connected to the primary circuit as previously mentioned so that when switch 22 opens and shuts down the system, it can concurrently also stop the fan. In the embodiment shown in FIG. 1, the fan 60 is displayed independent of the main circuit, this showing is only for purposes of clarity and is not considered a limiting factor.

Pneumatic timer 20 can be set to any specified length of time. This time period is functionally dependent upon the required distribution of the operation. The delay energization of coil 24 causes switch 22 to open and then to once again assume its closed position thereby beginning the distribution cycle all over again. This embodiment, of course, is not limited as shown to three stations, since stations can be added to either side of the distributing line without departing from the scope of the invention.

The number of receiving stations can be changed, either increased or decreased, by any desired number of stations at either end of the distributing system. That is receiving stations can be added at the right end of FIG. 1 by merely removing line 86 and inserting the desired number of transition valve relay combinations in parallel with those already existing. Line 86 would then be placed across the corresponding terminals of the last inserted stations. Other stations can also be added at the left end of FIG. 1 by removing line 94 and inserting in parallel with the existing stations a desired number of additional receiving stations, with the line 94 being replaced across the corresponding terminals of the left most station.

Reference is now made to FIGS. 2A, 2B and 2C which combine in the manner shown in FIG. 2 to make a complete circuit. The system shown therein discloses a distributing system with two remote sources of supply 100 and 102. These material supply sources 100 and 102 can contain different grades or types of the same material, or substantially the same grades of the same material (as for example different bales of similar cotton) depending upon the circumstances existing. The system also contains five receiving stations located at transition valves $V_1$, $V_2$, $V_3$, $V_4$ and $V_5$. This number is not limitative in any way, for it can clearly be ascertained that more than five or less than five stations could be used without departing from the scope of the subject invention.

The system can distribute to the five stations from both supplies 100 and 102. The system as shown in FIG. 2 allows the material located in supply source 100 to be distributed to receiving stations $V_3$, $V_4$ and $V_5$ while supply material from material source 102 is distributed to receiving stations $V_1$ and $V_2$. The station $V_3$ located in the center of the distributing system is a swing station, it can be fed from either supply source 100 or 102, but not simultaneously.

The operation of distributing these different materials from their respective sources is now explained. Master terminal block 115 in FIG. 2C contains the terminals for the master control circuit for the distribution of material supply 100. The power to the system is fed into terminal blocks $L_1$ and $L_2$ respectively. $L_1$ is the positive pole and $L_2$ is the negative pole. Master terminal block 238 in FIG. 2A contains the terminals for the master control circuit which controls the distribution of material supply 102. Terminals $L_1$ and $L_2$ of terminal block 238 are not connected to a power source. The presence of these blocks $L_1$ and $L_2$ allows a choice to be made, in determining which terminal block will be the power lead in. Switch 116 in FIG. 2C is the on-off switch for the system. Upon closing of switch 116 the system is energized to commence distribution, if any of the receiving stations indicate a demand for the respective materials. The demand signals are generated in this system similar to those generated in the system of FIG. 1, that is by level control switches, which indicate demand through an open condition thereof. These level control switches are shown by numbers 118, 120, 122, 124 and 126. In this particular distributing system, however, before distribution commences the selection of the respective receiving stations which receive supply from either material source supplies 100 or 102 is made. This selection is effected by a plurality of contact switches located on the lines to the "swing" station $V_3$. These selection circuits are indicated by numerals 128 and 130. As shown in FIG. 2B by the position of the relay contacts of selection circuits 128 and 130, the swing station $V_3$ is connected to receive the supply from material supply source 100. This condition is established by closing contact switches a, b, c, d and e of selection circuit 130 and opening the switches a, b, c, d and e of the selection circuit 128. An automatic selection is afforded by energizing the relay coil 131 of selection circuit 130, while deenergizing relay coil 129 of selection circuit 128. With the energization of either the relay coil 129 or 131, its respective contact switches are closed and the swing station $V_3$ is inserted into the line from which the material is desired to be fed. In place of these selection circuits shown as 128 and 130, a conducting plug could be used as shown at 132. When the conducting plug 132 is used in place of the selection circuits 128 and 130, it is manually inserted into the system.

For discussion purposes so that the system will be clearly understood its operation in selecting the stations which are to be fed along the line for distributing of material thereto is now described. For purposes of this description, it is assumed that stations represented and fed by transition valves $V_1$ and $V_2$ are fed from the material supply source 102, whereas the stations represented through transition valves $V_3$, $V_4$ and $V_5$ are supplied through the material supply source 100. For the system to establish this selection, the switches a, b, c, d and e of the selection circuit 130 are closed and the switches a, b, c, d and e of selection circuit 128 are open. The selection having thereby been made, three stations are fed from supply 100 and two stations are fed from the other supply 102.

The distributing operation is now described. On-off switch 116 is closed thereby energizing line 134. Line 134 is connected to terminal block 9 which through lines 136, 138, 140, 142, 144, 146 and 148 is connected to all the terminal blocks 9 of the system. The timer control circuit 163 used for purging the conduits 150, 152, 154 and 156 is composed of relay coil 162 and switch 164. The purging operation is conducted independently by each master control when the distributing operation for each set of receiving stations has been completed. The timer control circuits and their relationship to the purging operations subsequent to the distribution operations is described infra. Switch 164 is normally closed. From amongst the receiving stations represented through transition valves $V_3$, $V_4$ and $V_5$ to be fed from material distributed from supply 100, transition valve $V_3$ is the furthest away from the supply and it is therefore fed first. To feed this station first it is assumed that none of the other stations on this section of the line ($V_4$ and $V_5$) are being fed. The demand indicating means 122, 120 and 118 are therefore all open, indicating demand at each station. On conduit 150 there are two cutoff valves which are manually inserted in the conduit 150. These cutoff valves 166 and 168 are inserted in the line depending upon the source which feeds station $V_3$. If station $V_3$ is to be fed from supply 100, cutoff valve 166 is inserted in conduit 150 and cutoff valve 168 is removed. On the other hand, if the station represented by transition valve $V_3$ is to be fed from material supply source 102 cutoff valve 168 is inserted while cutoff valve 166 is taken out. The cutoff valves 166 and 168 could be controlled through a solenoid arrangement in conjunction with the selection circuits 128 and 130.

Level indicating switch 122 which generates the demand signal for station $V_3$ is open indicating that station $V_3$ is demanding that material from supply 100 be delivered to it. Transition valve $V_3$ is opened (when switch 116 is closed and level control valve 122 is open) through the following circuit: lines 135, normally closed switch 164, 137, 139, 141, switch c of selection circuit 130, lines 143, 172, terminal block 4 of distributing control circuit 108, line 174 through contact B of distributing control circuit 108, which is normally closed, to line 176, terminal block 7 to line 178 and relay coil 180. The energization of coil 180 opens valve $V_3$, placing it in a condition to receive supply from the supply source 100. Simultaneously the power from terminal block 4 of distributing control circuit 108 is transmitted to the feeder control circuit 182, located in FIG. 2C adjacent to the timer control circuit 163, through the following circuit: from terminal block 4 of distributing control circuit 108, through normally closed contact D of distributing control circuit 108, through line 184 to terminal block 5 of control circuit 108 via line 186, line 188 through switch d, which as previously stated is closed, through line 190 and to line 192 to terminal block 5 of the master control block 115, then through line 194 through safety switch 196, which is normally closed, to relay coil 198 to line 200, which is connected to the negative pole of the master control terminal block 12. The energization of coil 198, of feeder control circuit 182, closes switch 202 which is the control circuit, through lines 204 and 206, for the material supply source 100. The terminals 10 and 11 of the master control terminal block 115 are connected to motor and switch arrangement (not shown) as specifically shown in FIG. 1.

When this motor is activated material from supply source 100 flows through conduit 150 to the open transition valve $V_3$, being stopped at $V_3$ by the cutoff valve 166, and it continues to flow into the receiving station over which transition valve $V_3$ is located until the level control switch 122 indicates that the receiving station under transition valve $V_3$ is filled and its demand has been satisfied. The material is carried through the conduits by the vacuum created therein by fan 310.

The fan 310 is shown to be energized through an independent source 311, but it would be of ordinary skill in the art, to connect the fan 310, so that it is operationally dependent upon the distributing system.

The closing of switch 122 energizes relay coil 208 of distributing control circuit 108 through lines 207, 209 and the energization of relay coil 208 opens the normally closed contacts B and D of distributing control circuit 108 while simultaneously closing the normally open contacts A and C of the same distributing control circuit 108. The reversal of these contacts closes the transition valve $V_3$ by deenergizing its control winding 180, and through the opening contact D terminates the feeding operation by deenergizing relay feed winding 198. Relay control winding 208 of distributing control circuit 108 remains energized as long as level control valve 122 remains closed and also as long as contact A remains closed. Contact A functions as a lockin contact for relay coil 208.

Upon the satisfaction of demand or the receiving station which is fed through transition valve $V_3$, transition valve $V_4$ opens since the demand control switch 120, which is the level control switch of the station fed by transition valve $V_4$, is open thereby indicating demand. Transition valve $V_4$ is opened through the following circuit: from terminal block 3 of distributing control circuit 108, line 212, switch e of selection circuit 130, line 214, line 216, line 218, through normally closed contact B of distributing control circuit 106, line 220 to terminal block 7 of distributing control circuit 106. Line 222 then energizes relay coil 224, thereby opening the transition control valve $V_4$. The circuit is completed through line 226 to terminal block 8 of distributing control circuit 106, which is connected to the negative terminal block 2 of distributing control circuit 106. The transition control valve $V_4$ is now open and capable of receiving material supplied from the material supply source 100. To fulfill this demand the feeder control circuit 182 is energized through the following circuit: from terminal block 4 of distributing control circuit 106, through normally closed contact D of distributing control circuit 106 through lines 228 to terminal block 5 of distributing control circuit 106, through line 230, line 232 to line 190. This circuit energizes the feeder control relay 198 of feeder control circuit 182, thereby closing switch 202 and energizing the motor (not shown) of the supply 100.

Material supplied from material source 100 is conveyed by conduits 150 and 154 to transition valve $V_4$, which allows the material to be dumped into the receiving station located below it. This operation continues until level control demand indicating means 120 closes, indicating that the supply demand of the station fed by transition valve $V_4$ has been satisfied. The closing of level control switch 120 energizes relay coil 234 of distributing control circuit 106 through line 219. This energization closes the normally open contacts A and C of distributing control circuit 106, and opens the normally closed contacts B and D. This reversal, similar to the reversal which took place in the distributing control circuit 108, deenergizes the relay coil 224 of transition valve $V_4$, and it also cuts off the power to relay 198 of feeder control circuit 182. Distributing control circuit 106 is in the state of energization having contacts A and C closed and B and D open.

The equivalent distributing operation for the feeding of the receiving stations by transition valves $V_3$ and $V_4$ is performed to feed through transition valve $V_5$, since level control switch 118 is open indicating that the station requires material to be fed to it. This control operation is performed through distributing control circuit 104, which is shown in block form but the wiring thereof is in all respects equal to the wiring of distributing control circuits 106 and 108. When demand to the station controlled through transition valve $V_5$ is satisfied, distributing control circuit 104 deenergizes winding 236, closing the transition valve $V_5$ and simultaneously shutting off the feed supply from material supply source 100.

At the termination of the feeding operation the contacts of distributing control circuit 104 (i.e., A, B, C and D) are in the same position as the contacts shown for distributing control circuits 106 and 108, that is contacts A and C are closed while contacts B and D are open. It is noted that when the relays 208 and 234 are energized, at the closing of the level control demand switch 120 and 122, they remain energized even if the demand switches 120 and 122 open, since the contact A of distributing control circuits 104, 106, and 108 lock the relay coils of the respective relays in an energized condition. This assures that the receiving stations are sequentially filled without interruption from a receiving station further away from the supply source, whose demand switch is generating a demand signal, while a closer station is being filled.

The switches a, b, c, d and e of selection circuit 128 as stated above, are open indicating that only the receiving stations under $V_1$ and $V_2$ are fed from material supply source 102. Continuing the same sequence of feeding, that is, feeding the furthest receiving station away from the material supply source 102 first, the receiving station under $V_2$ is fed first. Master control terminal block 238 is equivalent to the master control terminal block 115, except that the two power line blocks $L_1$ and $L_2$ are not connected to a power source. This is a matter of choice and does not affect the operation of the system. It can be appreciated that the power source in this distributing system can be connected to either master control terminal block at the convenience of the plant installation requirements. Switch 240 is the on-off switch for the distribution of material from source 102, when it is closed the circuits in conjunction therewith are energized. Power to energize this section of the distributing system is received from lines 136 and 148 which are connected to terminal block 9 of the master control terminal 115. This power is forwarded to the terminal block 9 of master control terminal 238 through lines 170, 242 and 148.

From terminal block 9 of the master control terminal 238 power is introduced into the distributing system for supply 102 through line 244, timer control circuit 246, which is composed of relay 250 and switch 248, the latter being normally closed. Power is transmitted through line 252 to terminal block 1 on the master control terminal block 238. Assuming once again that level control switch 124, of the receiving station controlled by transition valve $V_2$, is open and is indicating demand. Level control switch 126 of transition valve $V_1$ is also open and is indicating demand, however, the system feeds the receiving station furthest away from the source 102 first.

This distributing operation transpires as follows. Power from terminal block 1 of master control terminal 238 is conducted to distributing control circuit 110 via the following lines: 254, 256, 258, 260, through switch a of selection circuit 130, line 262, 264, 266, 268 to terminal block 4 of distributing control circuit 110. The control winding 270 for transition valve $V_2$ is energized through the following circuit, from terminal block 4 of distributing control circuit 110: line 272, contact B of distributing control circuit 110 to line 274 and terminal block 7 of distributing control circuit 110, line 276 and return line 278 which is connected to terminal block 8 of distributing control circuit 110. The circuit is completed to ground terminal 2, through line 279. The transition valve $V_2$ is now open and material from supply source 102 can be fed to it.

The feed control circuit 294 for supply source 102 is activated through the following circuit: from terminal block 4 of distributing control circuit 110, through contact D of distributing control circuit 110, via line 280 to terminal block 5 of distributing control circuit 110. Power is then conducted via line 282, 284 to terminal 5 of the master control terminal block 238. Relay coil 286 is energized from terminal block 5 of the master control block 238, via line 288 and switch 290, which is a safety switch and which is normally closed. The energization of relay coil 286 closes switch 292 of feeder control circuit 294 energizing thereby the terminals 10 and 11 on the master control terminal block 238. These terminals 10 and 11 are connected to a feed supply motor similar to the one described in the operation of FIG. 1. When this feeder supply circuit is energized the material supply from source 102 is conveyed through conduit 150 and 158, feeding material into the receiving station controlled through the transition valve $V_2$.

When the supply demand of the receiving station is fulfilled, level control switch 124 is closed and it activates the relay coil 296 of distributing control circuit 110. The energization of the relay coil 296, of distributing control circuit 110, is accomplished only when level control switch 124 closes thereby energizing terminal block 3 of distributing control circuit 110 through lines 298 and 300. The power from this terminal block 3 of distributing control circuit 110 energizes relay coil 296 through lines 302 and 304. When coil 296 is energized the normally closed contacts B and D are open and the normally open contacts A and C are closed. This reversal, similar to the distributing control circuits described in the operation of the transition valves $V_3$, $V_4$ and $V_5$ closes the transition valve $V_2$ and terminates the feeding operation by deenergizing relay coil 286 of feeder control circuit 294.

The receiving station fed through transition valve $V_1$ and whose demand is indicated by level control switch 126 is now fed in a similar manner as the receiving station fed by transition valve $V_2$. This feeding operation is controlled through distributing control circuit 112 and control winding 306 of transition valve $V_1$. The terminal block 4 of distributing control circuit 112 receives its power, when level control switch 214 closes, through lines 300 and 301.

When the receiving stations' demand has been satisfied from the sources 100 and 102 the conduits 150, 154, 156, 158 and 160 are purged of any material which remains as residue in these conduits during the distributing operation. The purging operation for stations fed by transition valves $V_3$, $V_4$ and $V_5$ need not wait until the feeding operation of stations fed by transition valves $V_1$ and $V_2$ is completed. The purging like the feeding operation of each set of stations can be conducted independently of the other set of receiving stations. Assuming that the distributing operation for the receiving stations at transition valves $V_1$ and $V_2$ has been completed and the relay coils of the distributing control circuits 110 and 112 are energized and have reversed the normal positions of the respective contacts A, B, C and D of the distributing control circuits the purging operation commences. From the diagram in FIG. 2A it is noted that when coil 296 of distributing control circuit 110 is energized, contacts B and D controlling the feeding of material and the opening and closing of the transition valve respectively are open while contacts A and C are closed. The closing of contact A when demand has been fulfilled to the receiving station under transition valve $V_2$ assures that the next station, that is $V_1$, will have its demand satisfied even though at the same time level control switch 124 of transition valve $V_2$ may be open. In other words, contact A locks in the relay coil 296, to assure that the demand of the station under $V_1$ is satisfied and that the demand of station $V_2$ must wait its respective turn before it is filled.

When contact C of distributing control circuit 110 is closed the control winding 270 of transition valve $V_2$ is capable of being energized opening thereby transition valve $V_2$. However, before this energization takes place the demand of the receiving station fed through transition valve $V_1$ and indicated by level control switch 126 must be satisfied. When demand of this receiving station is fulfilled, level control switch 126 closes and reverses the contacts A, B, C and D of distributing control circuit 112 and the same state of probable energization of control winding 306 of transition valve $V_1$ is established. Power to energize these windings 270 and 306 is consequently received through lines 305, 307 and 308 when level control switch 126 closes, since terminal block 4 is in an energized condition. When line 308 is energized, it concurrently energizes block 6 of the terminal block of distributing control circuit 112, and also block 6 of terminal block of distributing control circuit 110, via lines 311, 313 and 315. This energizes the control windings 270 and 306 through closed contacts C of distributing control circuits 110 and 112, of transition valves $V_1$ and $V_2$, thereby opening the transition valves and allowing the purge of residue in conduits 150, 158 and 160 to take place. The timing period of the purge is controlled through the pneumatic timer control circuit 246 which can be chosen according to the prescribed requirements of the distributing system. The timing period is determined by the delay time coil 250 which is used in the system. The time delay coil 250 is energized through lines 311, 317, 319 and 321. The completion of the purge is accomplished when the time delay period established through the relay coil 250 has elapsed, this opens switch 248, which is normally closed, thereby shutting off the power to all the control circuits which are in a control position for the set of stations fed through transition valves $V_1$ and $V_2$. This set is now ready to commence the distributing operation once again from material supply source 102.

An equivalent purging operation is performed for the conduits 150, 154 and 156 leading to transition valves $V_3$, $V_4$ and $V_5$. This purging operation, however, is commenced whenever the receiving station being fed by transition valve $V_5$ indicates that its demand has been fulfilled. This condition occurs when level control switch 118 closes. As previously ascertained, the distributing control circuit 104 is equivalent in every respect to the other distributing control circuits 106, 108, 110 and 112. Therefore, when level demand switch 118 closes, it energizes the relay coil of distributing control circuit 104, reversing the states of contacts A, B, C and D. This closes transition valve $V_5$ and shuts off power to the feeding control circuit 182.

The purging circuit for the set of transition valves $V_3$, $V_4$ and $V_5$ is energized from terminal block 4 of distributing control circuit 104, through lines 327, 329 and 331. This places blocks 6 of all the terminal blocks of distributing control circuits 104, 106 and 108 in an energized condition via lines 333, 335, 337, 339 and 341. Concurrently it energizes block 6 of master control terminal block 115.

With the energization of blocks 6 of the distributing control circuits 104, 106 and 108, the control coils 180, 224, and 236 of the transition valves $V_3$, $V_4$ and $V_5$ are energized, since all contacts C are closed. This opens the transition valves $V_3$, $V_4$ and $V_5$. The fan 310 being in continuous operation, now draws any residue material found in the conduits 150, 154 and 156, into the nearest receiving station.

The time period of the purging operation is controlled through the pneumatic timer control circuit 163, composed of time delay relay 162 which is energized via lines 343, 345 and 347. When the time delay relay is fully energized, it opens switch 164, thereby terminating the purging operation. After a certain predetermined lapse of time, switch 164 assumes its normal closed position, and the distributing operation to the receiving stations being fed by transition valves $V_3$, $V_4$ and $V_5$ is commenced.

At any time after the purging operation the selection circuits 128 and 130 may be reversed, so that the receiving station being fed by transition valve $V_3$ is fed from material supply source 102, instead of material supply source 100. It can be readily ascertained then, that by using this system a distributing operation can be conducted which distributes two different materials from two remote and different supply sources concurrently and which are independently controlled.

The conduits are supplied with a vacuum for conveying the material thereby distributed. This vacuum is created through the fan 310. This fan 310 can be controlled magnetically by the master controls, however, for expediency in description and clarity of the invention, it is shown to be independent of the control circuits of the distributing system.

FIG. 3, consisting of FIGS. 3A and 3B, discloses another distributing system in which the selection of the receiving stations is automatically performed and it is extremely versatile due to the fact that the stations which are fed by the distributing system can be fed all from one supply at one time, or all from the other supply at another time, or a predetermined number of stations can be fed by each of the material sources so that only that number is fed by one source. The particular system which is shown consists of four stations, but is not necessarily limited thereto, more stations could be added to the system without destroying the inventive concept. In this system two sources A and B are shown, and each source can feed all four receiving stations or the nearest two, or the nearest one by automatically selecting which stations are to be fed from each respective source prior to the commencement of the distributing operation.

In this system as in the last system shown by FIG. 2, two master controls are needed, shown here as 400 and 402. A distributing control circuit is necessary for each receiving station shown as 404, 406, 408 and 410. The selection circuits in this embodiment are shown as a series of switches 412, 414, 416, 418 with five position switches within the selection circuits which are designated as a, b, c, d and e. All four of the selection circuits 412, 414, 416, and 418 are joined and operated concomitantly. The positions of the stepping switches a, b, c, d and e within the selection circuits determine which receiving stations are fed from which material supply source. For convenience of description the stepping switches a, b, c, d and e are further subdivided into numerals 1, 2, 3, 4 and 5. These terminals are delineated only in stepping switch a of selection circuit 414. The five positions which are available indicate the five probable combinations of distribution which the system can assume.

In position 1 all four receiving stations are fed from the right-hand material supply designated as B. At position 2 of the stepping switches a, b, c, d and e the distributing system feeds three stations ($V_1$, $V_2$ and $V_3$) from the right-hand supply B while feeding one station ($V_4$) from the left-hand supply A. In position 3 the system feeds evenly two stations ($V_1$ and $V_2$) from the right-hand supply B and two stations ($V_3$ and $V_4$) from the left-hand supply A. In position 4 the system feeds one station ($V_1$) from the right-hand supply B and three stations ($V_2$, $V_3$ and $V_4$) from the left-hand supply A. In position 5, as shown in the schematic circuit of FIG. 3, the system feeds all four receiving stations located below the transition valves $V_1$, $V_2$, $V_3$ and $V_4$ from the left-hand supply A. Only four stations are shown for convenience, it is understood that more than four stations could be used and that only two stations need be used, and still remain within the inventive concept of the subject invention.

In this distributing system like the system of FIG. 2 cutoff valves are required to separate the receiving stations when a number of them have been selected to receive particular material. These cutoff valves are shown in the conduits as 624, 626, 628, 630, 632, 634, 636, and 638. The cutoff valves are inserted into conduit 488 according to the preselection of the number of receiving stations, for example, if the system feeds two stations $V_1$ and $V_2$ from the right-hand material source B and two stations $V_3$ and $V_4$ from the left-hand material source A, then cutoff valves 628 and 634 are inserted into conduit 488. If all four stations $V_1$ to $V_4$ are fed from the right-hand material source B then only cutoff valve 626 would be required, alternatively if all four stations are fed from the left-hand material source A, then only cutoff valve 636 would be required in the conduit 488. The cutoff valves are manually inserted into the conduit 488, however, it would be a matter of ordinary skill to correlate their operation with the selection circuits.

The system as shown in FIG. 3, the operation thereof, is now fully explained. The power switch, designated as a simple on-off switch at 420, is located at the master control circuit A. This switch 420 could be located at either master control circuit A or B, it is shown at the master control A location merely for convenience. With the closing of switch 420 the complete distributing system is energized. Line 422 leads to block 9 of terminal block 424. From there through line 426 it leads to block 9 of terminal block 428 located at the master control circuit B. With the stepping switches a, b, c, d and e of the selection circuits 412, 414, 416 and 418 in position 5, as shown in the schematic, the master control circuit B and the supply source controlled therefrom is completely cut off from the system. This can be ascertained by following the circuit from the master control block 428 at block 1, which is the lead-in energization block for the circuit to line 430. At position 5 of the stepping switches a, b, c, d and e of the selection circuits the contacts connecting to line 430 are all open. Therefore, the master control circuit B and its supply source are effectively cut off from the distributing system.

Returning now to the master circuit control A, the active operation of the distributing system as shown by FIG. 3, is fully described. Power from the input in switch 420 is fed to terminal 1 of the master terminal block 424 through lines 432, switch 434, which is normally closed and line 436. Switch 434 and relay winding 438 compose the time control circuit 440, as will be explained later this timing control circuit 440, controls the purging period described in the systems of FIGS. 1 and 2. Lines 442 and 452 leading out from terminal 1 of the terminal block 424 connects the last receiving station in the line with the control circuit A. As explained in the previous systems of FIGS. 1 and 2 the distributing system feeds the furthest station away from the supply source first. This is a feature which is inherent in the system and it allows for the purging operation to be effectively conducted at the termination of the distributing operation and it also allows an automatic feeding on demand of each receiving station without overloading the conduits with material being distributed. The demand in each of the receiving stations is indicated by level control switches numbered 444, 446, 448, 450. These demand switches are located in each respective receiving station and are connected to the distributing control circuits 404, 406, 408 and 410. For this explanation it is assumed that all the receiving stations are demanding material, that is, the level control demand switches 444, 446, 448 and 450 are all open.

With the stepping switches a, b, c, d and e of the selection circuits 412, 414, 416 and 418 in position number 5 the receiving station being fed through the transition valve $V_1$ is fed first. The transition valve $V_1$ is normally closed but is open through the following circuit: line 442, line 452, through position 5 of stepping switch a of selection circuit 418, line 456 and line 460. This leads to block 4 of terminal block 462 of distributing control circuit 410. From block 4 transition valve $V_1$ is activated through the following circuit: line 464, line 466, $B_1$ of distributing control circuit 410, line 468 to terminal control block 7. This opens transition valve $V_1$ by energizing coil 470. The feeding control circuit 484 is activated through line 472, contact $D_1$ of distributing control circuit 410, line 474 to terminal 5 of terminal block 462. From this block 5 the circuit follows line 476 through position 5 of stepping switch d of selection circuit 418, line 478, line 480 to block 5 of terminal block 424 of the master control circuit A. This energizes coil 482 of the feeding control circuit 484, thereby closing switch 486 which is normally open. The closing of switch 486 energizes terminals 10 and 11 of the terminal block 424. The terminals 10 and 11 are connected to a three phase motor feeding arrangement similar to the material supply feed of FIG. 1. The energization of this feeding circuit allows material from A to be fed in through conduit 488 to conduit 490, wherein the transition valve $V_1$ is located, and the material A is dumped into the receiving station.

The material is conveyed through a vacuum system created in the conduit by fan 492 and exhaust conduit 494. The fan 492 can be controlled through both master controls A and B, however, for convenience it is shown to be of independent control and energized through power source 496.

Level control demand switch 444 closes when the demand of the receiving station fed through transition valve $V_1$ is fulfilled. The closing of this switch activates coil 490 and reverses the positions of the contacts controlled therefrom, namely contacts $A_1$, $B_1$, $C_1$ and $D_1$ of distributing control circuit 410. Contacts $A_1$ and $C_1$ which are normally open are closed, contacts $B_1$ and $D_1$ which are normally closed are opened. The opening of contact $B_1$, closes the transition valve $V_1$ by deenergizing coil 470 (the opening of contact $D_1$ deenergizes the feeding circuit at master control circuit A by deenergizing coil 482), thereby opening switch 486 and stopping the feed of material A.

The receiving station located by transition valve $V_2$ is now fed from the material supply A, since it was assumed that level control switch 446 was initially open. The transition valve $V_2$ of distributing control circuit 408 is opened through the closing of level control valve 444 of distributing control circuit 410 which not only energizes coil 498, reversing the contacts controlled therefrom, but it also energizes block 3 of terminal block 462 through line 500. Line 502 leading to stepping switch b of selection circuit 418 through line 504 leads into stepping switch c at position 5 of the selection circuit 416. This leads to block 4 of terminal block 506 via line 508. Coil 514 of transition valve $V_2$ is energized from block 4 through line 510, contact $B_2$ which is normally closed, line 512 and block 7. With transition valve $V_2$ now open, the material from supply A can be fed to its receiving station when the feeding circuit 484 is concurrently energized.

The feeding circuit is energized from block 4, line 510, contact $D_2$, which is also normally closed, line 516 to terminal block 5, to position 5 of stepping switch d of the selection circuit 416 via line 518, to line 520, line 480 to block 5 of terminal block 424. This energizes the feeding control circuit 484 in the same manner as previously described for the feeding through transition valve $V_1$.

The feeding control circuit 484 now feeds material A through conduit 488 to conduit 522 and dumps the material through the open transition valve $V_2$ into its respective receiving station. When the demand of the receiving station fed by transition valve $V_2$ is fulfilled level control switch 446 is closed indicating that the demand of the receiving station has been fulfilled. The closing of switch 446 energizes coil 524 thereby opening the normally closed contacts $B_2$ and $D_2$ and closing the normally open contacts $A_2$ and $C_2$. This reversal closes the transition valve $V_2$ by deenergizing coil 514 and cuts off the feeding circuit 484 by deenergizing coil 482.

The receiving station fed by transition valve $V_3$ is now fed, since the level control switch 448 is initially open, as previously assumed, thereby indicating a demand at this station. The transition valve $V_3$ is opened when the closing of level control switch 446 energizes block 3 of terminal block 506 through line 526. Consequently block 4 of terminal block 532 is energized via line 528, position 5 of stepping switch b of selection circuit 416, then through line 530 to position 5 of stepping switch c of selection circuit 414. This establishes a voltage at block 4 of terminal block 532 of distributing control circuit 406 through line 534.

Coil 536 of transition valve $V_3$ is energized from block 4 of terminal block 532 through line 538 contact $B_3$ of distributing control circuit 506 and line 540 which leads to block 7 of terminal block 532. Concurrently the feeding circuit is energized through line 542 emanating from block 4 of terminal block 532 through contact $D_3$ of distributing control circuit 406, line 544, block 5 of terminal block 532, line 546, position 5 of stepping switch d of selection circuit 414, line 548 to line 480. This, energizes the coil 482 of the control feed circuit 484. The energization allows material A to be fed through conduit 488 to conduit 550 and to the receiving station fed through transition valve $V_3$.

When level control switch 448 closes thereby indicating that the demand at this respective receiving station has been fulfilled it energizes coil 552 thereby opening the normally closed contacts $B_3$ and $D_3$ and closing contacts $A_3$ and $C_3$ of distributing control circuit 406. This reversal once closes the transition valve $V_3$ by deenergizing coil 536 and terminates the feeding of material A from source supply A by deenergizing coil 482 of feeding control circuit 484.

With the closing of level control switch 448 transition valve $V_4$ is open through the following circuit: line 554, block 3 of terminal block 532, line 556, position 5 of stepping switch b of selection circuit 414, line 558, position 5 of stepping switch c of selection circuit 412, line 560 and block 4 of terminal block 562, line 564, contact $B_4$ of distributing control circuit 404, line 566 and block 7 of terminal block 562. This energizes coil 565 of transition valve $V_4$ thereby opening transition valve $V_4$ and allowing material to be fed to its receiving station. The feeding circuit is energized through line 568, contact $D_4$ of distributing control circuit 404, line 570 through block 5 of terminal block 562, line 572, through position 5 of stepping switch d of selection circuit 412, to line 574 and line 480. This energizes coil 482 of feed control circuit 484 through block 5 of terminal block 424. Material A is fed by conduit 488 to conduit 576 through the transition valve $V_4$ and into its respective receiving station.

When the demand of the receiving station is fulfilled level control circuit 450 is closed energizing thereby coil 578. This coil reverses the normal positions of contacts $A_4$, $B_4$, $C_4$ and $D_4$, deenergizing the coil 564 of transition valve $V_4$ and concurrently deenergizing coil 482 of feeding circuit 484 terminating the feed of material A to the receiving station fed by transition valve $V_4$.

The closing of level control valve 450 not only terminates the distributing operation but it indicates that the system is ready to be purged since the receiving station fed through transition valve $V_4$ is the last station in the line. When level control switch 450 closes it energizes the time control circuit 440 and it opens all the transition valves so that any residue remaining in the conduits 488, 490, 522, 550 and 576 is purged through the transition valves $V_1$, $V_2$, $V_3$ and $V_4$ into the nearest receiving station. This operation is accomplished in the following manner. Block 3 of terminal block 562 is energized through line 580 when level control switch 450 closes. The line 582 leading therefrom activates transition valves $V_4$ through position 5 of stepping switch b of selection circuit 412, block 6 of terminal block 562, through line 586, contact $C_4$ of distributing control circuit 404 which is now closed, due to the energization of coil 578, through line 566 to block 7 of terminal block 562. This opens transition valve $V_4$. The other transition valves are energized from line 584 through position 5 of stepping switch e of selection circuit 412, through line 587 and line 588. Transition valve $V_3$ is activated through the circuit composed of line 590, line 592, block 6 of terminal block 532, line 620, contact $C_3$ and line 540. Transition valve $V_2$ is opened through the circuit of line 588, line 594, line 596, block 6 of terminal block 506, contact $C_2$ and line 512. Transition valve $V_1$ is opened through line 588, line 598, line 600, line 602, contact $C_1$ of distributing control circuit 410, and line 468. Concurrently, through line 588, the timing control circuit 432 is energized through block 6 of terminal block 424 and line 604.

Coil 438 of time control circuit 440 is a pneumatic delay relay type of coil; it closes switch 434 when it becomes energized and it opens switch 434 after a definite time lapse, functionally determined by the size of the system. When the delay time has elapsed coil 438 is completely deenergized and switch 434 is once again closed commencing the distributing operation once again.

The master circuit B is composed of the same two basic circuits as master control circuit A, that is, the feeding control circuit 606, composed of a switch 608 and coil 610, and the time control circuit 612, also composed of a delay type relay of coil 614 and switch 616. The master control circuit B controls the distributing operation of the material B in exactly the same manner as master control A when the stepping switches $a$, $b$, $c$, $d$ and $e$ are in their proper positions as previously ascertained.

The versatility of this system is not limited by the number of stations which is to be fed and it must be understood that the number shown in the figures is merely drawn for exemplary purposes and is not to be limiting. The stepping switches are shown in a straight line manner also as a matter of convenience, in practice they are usually rotary switches which can assume five different positions as selected by the operator of the system.

The number of stations can be changed, either increased or decreased, by any desired number, at either end of the system. The addition or subtraction of stations can be accomplished by inserting the control circuit for distribution and the selection circuit for selectivity by adding these circuits in parallel with the existing stations without mitigating the inventive concept of the subject invention.

Reference is now made to FIG. 4 which illustrates another embodiment of the invention in schematic whereby the distributing system has the ability to feed all of the stations from one of two sources or a predetermined number of stations from one supply and the rest from the other. This system is especially versatile and flexible in that the source which feeds a given station can be changed by throwing a ganged switch, inserting a single plug or manual cutoff valve into the conduit 676 through which the fiber passes and removing another plug. In this embodiment, two sources of fiber, source A and source B, are adapted to feed fibers, which are suspended in a moving air stream, in the same manner as described in connection with FIGS. 1–3, to stations 650, 652 and 654. As will become apparent from the following detailed description of the operation of FIG. 4, this embodiment is not limited to any particular number of stations, and it will become obvious how more stations can be added or deleted.

In this embodiment, as in the embodiments shown in FIGS. 2 and 3, a Master Control comprised of a number of relays which cause the source to feed fibers into the conduit 676 and which cause purging after all stations demanding fibers have been supplied is associated with each source. Master control 656 is associated with source B, and master control 658 with source A. The distribution system for both sources is energized by applying an electrical potential, for example 110 volts AC, between lines 660 and 662. For purposes of illustration, line 660 is shown connected to the positive pole of an alternating current source, and line 662 to the negative pole.

As in FIGS. 1, 2 and 3, transition valves 666, 668 and 670 are associated with stations 650, 652, and 654 so that when any of these valves are opened, fiber is extracted from the conduit 676 and air which was carrying the fiber passes on into the conduit 678, drawn by the fan 680. Fan 680 may be energized by applying an electrical potential between the lines 682 and 684 in the same manner as shown and discussed in connection with FIGS. 2 and 3, or the fan may be energized only when fiber is being distributed or the system purged. Alternatively, each station may have an individual fan associated with it. The operation and structure of transition valves such as valves 666, 668 and 670 are described more fully in connection with FIG. 5.

The distribution system of this embodiment is capable of supplying the fiber requirements of any of the stations 650, 652 and 654, whenever any of the level control switches, 682, 684 or 686, respectively associated with each of these stations, is opened, indicating thereby the need for additional fiber at that station. The position of each of the ganged switches 690, 692 and 694, each of which is comprised of five individual switches, determines from which source the station associated with that switch is to be fed. For example, when any of the ganged switches is positioned in the "up" position that ganged switch 690 is shown in, then that station will be fed solely from source B. When any of the ganged switches is positioned in the "down" position that ganged switch 694 is shown in, then that station will be supplied solely from source A. This choice between "up" or "down" positions is of course arbitrary, and is made solely for the purpose of detailing the operation of this embodiment. This embodiment could also be used with more than two sources by adding additional positions which the ganged switches can assume and additional circuitry in the same manner as the circuitry already present. Therefore, whenever the ganged switches are in the positions shown in FIG. 4, stations 650 and 652 will be supplied from the source B and station 654 will be supplied from source A. It is apparent that all three of the stations could be supplied from either source or two could be supplied from one and one from the other. Any of the stations can of course be removed from the system so that no fiber is supplied to it by throwing the appropriate on-off switches as described below.

In this embodiment, stations which are shown closest to each supply need not be supplied from that source. Furthermore, if two or more stations are demanding fiber from either supply, stations to the "left" receive fiber first. Neither of the conditions necessarily is indicative of the actual physical arrangement since the stations can be physically disposed in any location, regardless of their position in the schematic of FIG. 4, so that station 650, for example, could be just as easily located next to source A as source B. It should then be obvious that the arrangement of switches on FIG. 4 is not a limitation.

Assuming that the ganged switches 690, 692 and 694 are all in the position shown and that the level control switches 682, 684 and 686 are all open, calling for fiber, the operation of this embodiment will now be detailed. Whenever all of the level control switches of all of the stations to be fed from source B are closed, indicating no need for fiber at any of the stations, current passes through coil 696 of recycle timer relay 698 and coil 700 of relay 701, preventing the distribution system which distributes fiber from source B from operating, while also interrupting the circuit which supplies the electrical excitation to cause source B to supply fibers. When this embodiment is then operated with the ganged switches 690, 692 and 694 in the positions shown in FIG. 4 with stations 650 and 652 then supplied from source B and station 654 from source A, a current path leads through coils 696 and 700 via lines 660 and 702, normally closed switch 704, line 706, switch 708 of ganged switch 690, lines 710 and 712, closed level control switch 682, lines 714 and 716, switch 718 of ganged switch 690, line 720, switch 722 of ganged switch 692, lines 812 and 814, level control switch 684, lines 838 and 840, switch 726 of ganged switch 692, line 728, switch 730 of ganged switch 694, line 732, switch 734 of ganged switch 694, line 736, coils 696 and 700, and line 662.

The passage of current through coil 700 opens normally closed switch 737 immediately, cutting off the current which was flowing through coil 738 of feeder relay 739 via lines 660, 740 and 742, closed switch 737, and line 744. The normally closed switch 746 then opens immediately preventing source B from supplying fibers to conduit 676 in the same manner as in FIGS. 1–3. However, the switch 746 delays for a short time in closing after current beings to flow through coil 738 so that the system will be fully prepared to receive fiber fed into the conduit 676 from source B.

The normally closed switch 704 delays for a period of a few seconds in opening so that purging can be accomplished as described below. Switch 704 then opens a predetermined time after current begins to flow through coil 690 and interrupts the flow of current through coils 696 and 700. The interruption of current through coil 700 closes switch 737 and the interruption of current through coil 690 closes switch 704 recompleting the current path through coils 690 and 700. Therefore current will flow through coils 690 and 700 except during momentary periodic intervals during which switch 704 briefly opens and switch 737 briefly closes. Switch 737 never closes however for a time sufficient to allow coil 738 to close the switch 746 which delays for a few seconds in closing.

However, when the passage of current through coils 690 and 700 is interrupted by the opening of either or both of the level control switches 682 and 684, switch 737 remains closed and current flows through coil 738 of feeder relay 739 until switch 746 closes causing source B to begin to supply fibers.

Between the time when a level control switch opens and when switch 746 closes, the transition valve of the station demanding fiber which is to be supplied first is opened so that fiber can be supplied to that station. For the purposes of explaining the operation of this embodiment, the switch 682 will be assumed to open first followed immediately by the opening of switch 684. It will of course be understood that should one level control switch 682 or 684 open, and not the other, the station associated with the open level control switch alone will be fed.

Since stations 650 and 652 are both supplied from source B, station 650 receives the fiber from source B first since it is furthest to the "left" in the drawing. As pointed out above, this does not necessarily mean that station 650 is physically nearest to source B or to the "left." Because the switch 682 is open, current flows through the relay coil 750, opening the valve 666 in the same manner as described in connection with FIGS. 1, 2, 3 and as detailed later in connection with FIG. 5. The positive pole of the potential connected to line 660 is then electrically linked to one side of the coil 750 via line 702, closed switch 704, line 706, switch 708 of ganged switch 690, lines 710, 712, 752 and 754, switch 756, line 758 and on-off switch 760. The negative pole attached to line 662 is attached to the other side of coil 750 via lines 762 and 744 so that the potential between lines 660 and 662 appears across coil 750, opening valve 666.

The transition valve 666 remains open, supplying fibers to the station 650 until the level control switch 682 closes, indicating that the station has received a sufficient amount of fiber. The closing of switch 682 then completes a current path through the relay coil 790 of the relay 792. This path leads from the positive pole through lines 660 and 702, normally closed switch 704, line 706, switch 708 of the ganged switch 690, lines 710 and 712, switch 682, line 800, coil 790, and lines 762, 744 and 662 to the negative pole. The passage of current through coil 790 immediately closed switch 802 and shifts switch 756 from contact with line 754 to contact with line 804. This interrupts the current flowing through coil 750 and the transition valve 650 closes immediately. The closing of switch 802 provides a parallel path around switch 682 so that current will flow through coil 790 until all the stations which are to be fed from source B have received fiber, even if switch 682 opens indicating a need for additional fiber.

The closing of switches 682 and 802, which occurs when the fiber needs of station 652 have been completely satisfied, also completes a current path through the relay coil 806 which in turn opens the transition valve 668 in the same manner as valve 666. This current path through coil 806 begins at line 660 and continues through line 702, closed switch 704, line 706, switch 708 of ganged switch 690, lines 710 and 712, level control switch 682 (or line 752, switch 802 and line 800) lines 714 and 716, switch 718 of ganged switch 690, line 720, switch 722 of ganged switch 692, lines 812, 814 and 816, switch 818, line 820, on-off switch 822, coil 806, and lines 762 and 744 to line 662. In the same manner as described in connection with the operation of station 652, valve 668 remains open as long as the level control switch 684 indicates a need for additional fibers by remaining open. The closing of switch 684 connects the coil 824 of relay 826 between lines 814 and 762 which are respectively at the potential of the lines 662 and 660. The passage of current through coil 824, which results from the closing of level control switch 684, closes switch 830 and shifts switch 818 from line 816 to line 834, interrupting thereby the passage of current through coil 806 and closing valve 668.

Since station 652 is the last station which is to be fed from source B, the system is now purged in a manner similar to that discussed in connection with FIGS. 1, 2 and 3. The closing of switch 684 completes a current path through the coil 700, opening the switch 737. The opening of switch 737 interrupts the current path through coil 738 of the feeder relay 739, opening the switch 746 immediately. The opening of switch 746 then removes the excitation which causes the source B to supply fibers. This current path through coil 700 leads from line 660, through line 702, normally closed switch 704, line 706, switch 708 of ganged switch 690, lines 710, 712, and 752, closed switch 802, lines 800, 714 and 716, switch 718 of ganged switch 690, line 720, switch 722 of ganged switch 692, lines 812, 814 and 816, switch 830, lines 836, 838 and 840, switch 726 of ganged switch 692, lines 728, switch 730 of ganged switch 694, line 732, switch 734 of ganged switch 694, line 736, coil 700 and line 662. Since coil 690 is connected in parallel with coil 700 a path also passes through coil 690. After current passes through the coil 690 for a predetermined length of time the switch 704 opens interrupting the paths through the coils 690 and 700.

The closing of the level control switch of the last station which is to be fed from source B, in this example switch 684, also completes a circuit through the relay coils associated with each of the transition valves of stations fed from source B so that purging occurs. The closing of switch 684 then connects coils 750 and 806 between lines 762 and 736, which are respectively at the potentials of lines 660 and 662. Current passes from line 762 through coil 750, on-off switch 760, switch 756, line 804, and switch 856 to line 736, and from line 762 through coil 806, on-off switch 822, line 820, switch 818, line 834, and switch 868 to line 736.

Between the time when switch 746 opens and when switch 704 opens, the system is purged. All of the transition valves associated with source B, in this example transition valves 666 and 668, are open but no additional fiber is supplied from source B. The opening of switch 704 interrupts the current path through coils 790 and 824, opening switches 802 and 830 and shifting switch 756 from line 804 to 754 and switch 818 from line 834 to 816. The movement of switches 756 and 818 interrupts the current paths through coils 750 and 806, closing valves 666 and 668.

In addition, the opening of switch 704, also interrupts the current paths through coil 690 and 700 closing switch 737 and switch 704. The closing of switch 704 recompletes the current path through coils 690 and 700, opening switch 737 immediately and switch 704 after a predetermined time, as well as completing the path through coils 790, 824, 750 and 806. Therefore, the system will purge itself in the manner described each time switch 704 opens until a level control switch, in this example switch 682 or 684, opens, indicating a need for additional fiber at which time the system will supply fiber to the station in the manner described. Often, the number of stations fed will be sufficient so that a level control switch will usually be open after a single purging.

At the same time that station 650 is being fed, station 654 is being simultaneously and independently supplied from source A. A plug or manual cutoff valve 835 would of course have to be inserted in the conduit between the stations 652 and 654 to insure that each station would be fed by just one source.

The distribution system associated with source A operates similar to the system associated with source B in that whenever all of the level control switches associated with source A are closed, source A is prevented from supplying fibers and the system is periodically purged. Since in this example only station 654 is supplied from source A, level control switch 686 when closed completes a circuit through coils 860 and 862 via lines 660, 740, 864, and 866, normally closed switch 868, line 870, switch 872 of ganged switch 690, line 874, switch 876 of ganged switch 690, line 878, switch 880 of ganged switch 692, line 882, switch 884 of ganged switch 692, line 886, switch 890 of ganged switch 694, lines 892 and 894, level control switch 686, lines 896, and 898, switch 900 of ganged switch 694, lines 902 and 904, coils 860 and 862, and lines 906, 908, 762, 744 and 662. When switch 686 is closed, current also flows through coil 910 of relay 912 from line 762 which is at the potential of line 660 to line 902 which is at the potential of line 662 via lines 914, 896 and 898, and switch 900 of ganged switch 694. As described in connection with master control 656 switch 868 will periodically open and the system will repeatably purge itself until switch 686 opens, indicating a need for additional fibers.

When level control switch 686 opens, the current path through coils 862 and 860 is interrupted and the normally closed switch 916 closes. The closing of switch 916 connects coil 918 between line 762 which is at the potential of line 662 and line 864 which is at the potential of line 660, via line 920. The passage of current through coil 918 closes switch 922 which applies an excitation to the source A to cause fibers to be fed into the conduit 676. However, switch 922 delays a few seconds in closing so that the station will be fully ready to receive the fibers.

The opening of level control switch 688 also completes a current path through coil 924, opening valve 670 thereby, from line 886, which is at the potential of line 660, switch 890 of ganged switch 694, lines 892, 894 and 826, switch 928, on-off switch 932, line 934, and coil 924 to line 762 which is at the potential of line 662. When switch 686 closes indicating that enough fibers have been fed to station 654, a circuit is completed through coil 910 from line 894 to line 762 and switch 928 shifts from line 926 to line 930.

Since station 654 is the only station fed from source A, the system is purged after the fiber needs of station 654 have been satisfied. The closing of switch 686 completes a circuit through coils 860 and 862, opening switch 916 and halting the feeding of fiber into the conduit from source A. The coil 924 is also connected between line 762 which is at the potential of line 662 and line 902 which is at the potential of line 660, via the on-off switch 932, line 934, switch 928, line 930, switch 936 of ganged switch 694 and line 938.

This embodiment also has the further advantage that any of the stations can be wholly removed from the system. For example, station 650 can be removed by closing switch 940, shorting switch 682, and opening switch 750, preventing the opening of valve 666. This feature could also be utilized with any of the other embodiments of the invention disclosed herein.

Reference is now made to FIG. 5 which discloses another embodiment of the invention whereby the distributing system has a single station and a number of stations which can be fed only from one source and a second group of stations which can be fed from either source depending on the position of a ganged switch or switches similar to those described in connection with FIG. 4. In the particular embodiment illustrated in FIG. 5, three stations are shown, one of which is always fed from source A, another which is always fed from source B and a third which may be fed from either source A or B. As in the embodiment discussed in connection with FIG. 4, the source which feeds the "swing" station may be changed by throwing the ganged switch, inserting one plug or manual control valve and removing another.

This embodiment also illustrates one type of transition valve 1000 which can be used with this invention in any of the embodiments detailed in connection with FIGS. 1 to 6. This valve 1000 operates to separate the fibers from the moving air stream and to deposit them in a shaft 1002 which channels the fibers into a machine capable of using the fibers. This valve 1000 is opened so that the air stream which carries the fibers through conduit 1004 is diverted into a side channel, for example channel 1006 in connection with station 1008, whenever the distribution system associated with station 1008 calls for fibers by opening the level control switch 1010. The opening of switch 1010 allows current to pass through coil 1012 in the manner described below. The passage of current through the coil 1012 then operates an air valve 1014, allowing air into the pneumatic plunger valve 1016 to push plunger 1018 so that the damper valve 1020 is shifted to allow air to pass through the channel 1022.

The opening of the damper valve 1020 then permits the moving air stream to enter the side channel 1006 and push aside the flap 1024, which blocks the channel and prevents leakage whenever the valve 1020 blocks off the chamber 1022. The position of the flap 1024 while the valve 1020 is open is shown in dotted lines. The moving air continues past the flap 1024 into the open area 1026 where the rotating doffer 1028 knocks the fibers from the air stream and into the arms of a second rotating doffer 1030. The doffers 1028 and 1030 may be driven in the same manner as the fan 1036, or by any other means. The air stream, freed of the fibers, passes through the arcuate perforated stationary screen 1032, and then through the channels 1022 and 1034 to the fan 1036. The fan 1036 is independently energized from lines 1038 and 1040 in the same manner as described in connection with FIGS. 2 and 3. The rotating doffer 1030 catches the falling fibers and deposits them in channel 1002 which leads into the machine which utilizes the fibers. Valves 1040 and 1042, associated respectively with stations 1044 and 1046 operate in the same manner separating the fibers from the moving air stream in the conduit 1004, whenever the respective valves 1048 and 1050 are opened by the passage of current through coils 1052 and 1054.

The operation of this embodiment is quite similar to the embodiment of FIG. 4 except that only the middle station has the ability to be fed from either station. It is of course to be understood that the middle station is not necessarily situated between two other stations. It could indeed be located anywhere physically, and any number of these switchable stations could be added without difficulty. In addition, this embodiment could be built with any number of "swing" stations desired.

As in FIG. 4, this embodiment is started by applying a source of electrical potential between lines 1060 and 1062. For purposes of discussion the positive pole is shown applied to line 1060 and the negative pole to line 1062. As described in connection with FIG. 4, the ganged switch 1063 is so constructed that when it is in the "up" position, that is the position it is shown in FIG. 5, the station 1044 will be fed solely from source B. Conversely, when it is in the "down" position, it will be fed solely from source A. Two plugs or manual control valves 1064 and 1066 are also provided so that one can be inserted into the conduit 1004 to insure that station 1044 will be fed from only one source. Plug 1066 would be inserted when the "swing" station is to be fed from source B as in the example detailed below.

The operation of this embodiment will now be described with the ganged switch 1063 in the "up" position and the plug 1066 inserted into the conduit 1004. For purposes of description it will be assumed that all three of the level control switches 1010, 1070 and 1072 are open. Of course, the system is capable of satisfying the fiber needs of any station or any number of stations.

The opening of level control switch 1010 interrupts a current path through relay coil 1080 of relay 1082, opening thereby switch 1084 and shifting switch 1086 from line 1092 to line 1090. The opening of level control switch 1010 also interrupts a current path through the recycle timer coil 1094 so that the normally closed switch 1096 closes. In addition, the opening of switch 1010 results in the interruption of the current flowing through coil 1098 of relay 1100, allowing switch 1102 to return to its normally closed position. The closing of switch 1102 then completes a current path through coil 1104 of the feeder relay 1106, closing the switch 1108, thereby starting the feeding of fibers from source B. However, switch 1108 does not close for a predetermined period of time after current begins to flow through coil 1104 so that the station 1006 is fully prepared to accept the fiber when it is fed into the conduit 1004.

The closing of switch 1096, which occurs as soon as current ceases to flow through coil 1094, completes a current path through coil 1012 via lines 1060, 1110, closed switch 1096, lines 1112 and 1114, switch 1086, line 1116, coil 1012, and lines 1118, 1120 and 1062. Passage of current through coil 1012 serves to open damper valve 1020 in the manner described above. The damper valve 1020 closes preventing the extraction of further fiber for station 1008 when the level control switch 1010 closes indicating that station 1008 has received sufficient fiber.

The closing of switch 1010 also allows current to flow through the coil 1080 via lines 1060 and 1110, switch 1096, line 1112, level control switch 1010, line 1121, coil 1080 and lines 1118, 1120 and 1062. The passage of current through coil 1080 closes switch 1084 insuring that coil 1080 will still have current flowing through it until all the stations to be fed from source B have been so fed, even if level control switch 1010 reopens and shifts switch 1086. The movement of switch 1086 from line 1090 to line 1092 interrupts the current path through coil 1012 and closes the damper valve 1020.

The closing of switch 1010 completes a current path through the coil 1052, opening the valve 1048 via lines 1060 and 1110, switch 1096, line 1112, level control switch 1010, line 1140, switch 1142 of ganged switch 1063, lines 1144, 1146 and 1148, line 1150, switch 1152, line 1154, coil 1052 and lines 1118, 1120 and 1062.

After the fiber needs of station 1044 have been fully satisfied, level control switch 1070 closes, energizing thereby coil 1156. The passage of current through coil 1156 closes switch 1158 and shifts switch 1152 from line 1150 to 1158. Since station 1044 is the last station to be fed from source B, the closing of switch 1070 initiates purging of the conduit 1004 in the same manner as described in connection with FIG. 4. The closing of switch 1070 completes the current paths through coils 1094 and 1098 via lines 1060 and 1110, switch 1096, line 1112, switch 1010 (or line 1114 and switch 1084), line 1140, switch 1142 of the ganged switch 1063, lines 1144, 1146 and 1148, switch 1158, lines 1160 and 1162, switch 1164 of ganged switch 1062, lines 1166 and 1168, coils 1094 or 1098, and line 1062.

As described in connection with FIG. 4, the passage of current through coil 1098 opens switch 1102 preventing the passage of further current through coil 1104 and opening switch 1108, thereby stopping the flow of fibers from the source B into the conduit 1004. The switch 1096 however delays in opening for a period of time after the current begins to flow through coil 1094 and during this time coil 1012 completes a current path between line 1118 which is the potential of line 1062 and line 1168 which is at the potential of line 1060 via line 1116, switch 1086, and line 1092. Similarly current flows through coil 1052 from line 1118 to 1168 via line 1154, switch 1152, line 1158 and switch 1170. The opening of switch 1096 interrupts the flow of current through coils 1080, 1156, 1112 and 1052 and system proceeds to periodically purge itself as described in FIG. 4 until either level control switch 1010 or 1070 opens.

At the same time that source B is supplying stations 1008 and 1044, the opening of level control switch 1172 energizes coil 1054, opening valve 1042, via a path from line 1060 through lines 1186, switch 1182, line 1220, switch 1218 of ganged switch 1063, line 1216, switch 1214 of ganged switch 1063, line 1212, line 1202, switch 1200, line 1190, coil 1054 and lines 1118, 1120 and 1062. The opening of switch 1172 also interrupts the current path through coils 1176 and 1178, closing the switch 1180 and 1182. The closing of switch 1180 allows current to flow through coil 1184 via lines 1060, 1186 and 1188, switch 1180, coil 1184, and lines 1118, 1120 and 1062. The switch 1174 is then closed after a short delay to start the flow of fibers from source A.

When switch 1172 closes indicating that station 1046 has received a sufficient supply of fibers, coil 1196 is energized, closing switch 1198 and shifting switch 1200 from line 1202 to line 1204. Since station 1046 is the last station to be fed from source A, closing of switch 1172 initiates the purging of the system in the same manner as described in connection with FIG. 4. The closing of switch 1172 completes a current path through relays 1176 and 1178 so that switch 1180 is immediately opened, resulting in the opening of switch 1174. The switch 1182 is opened after a period of time during which current passes through the coil 1054 via lines 1062, 1120 and 1118, coil 1054, line 1190, switch 1200, line 1204, line 1208, line 1210, switch 1172, line 1212, switch 1214 of the ganged switch 1063, line 1216, switch 1218 of the ganged switch 1063, line 1220, closed switch 1182, and lines 1186 and 1060. The opening of switch 1182 interrupts the current path through coils 1054 and 1196 and the system proceeds to purge itself periodically in the manner described in connection with FIG. 4 until level control switch 1172 reopens, indicating that station 1046 is in need of additional fibers.

Reference is now made to FIG. 6 which is comprised of FIG. 6A, 6B and 6C and which illustrates schematically another embodiment of the invention whereby a plurality of stations are fed from three independent sources. In this embodiment, six stations are shown, but it will be obvious, in view of the discussion of the operation of this embodiment below, how stations can be simply added or subtracted. Further, as in FIG. 4 and 5, the stations are arranged so that stations to the "left" will always be fed first. This, of course, has no physical significance since stations can be easily rearranged, but is merely to make the illustrations as clear as possible.

This embodiment is also especially flexible and versatile in that the source which feeds a given station can be changed merely by operating three manual switches, inserting one plug or manual control valve, and removing another. Moreover the system is so constructed that more sources can be added without alteration of any of the circuitry by merely adding a few wires in the same manner as the existing circuitry.

Sources A, B and C feed fiber into conduit 1300 to meet the fiber requirements of stations 1302, 1304, 1306, 1308, 1310 and 1312. Which of the stations is fed from each respective source is determined by the positions of the manual switches associated with each station. For example, referring to the manual control switches associated with station 1302, manual switch 1314 is set to a position corresponding to the source from which it is to be supplied if it is the first station which must be supplied with fiber, i.e., it is the station supplied from that source furthest to the "left," and to the "off" position if it is not the first station to be supplied. Switch 1316 is then set to the position corresponding to the source from which station 1302 is to be supplied. Switch 1318 is set to the "continue" position if the station is not the last station in line to receive fibers and to the "end" position if it is the last station to receive fibers from that particular station, i.e., it is the station furthest to the "right" supplied from that source.

The operation of this embodiment will now be detailed. When the manual switches are in the position shown in FIG. 6, stations 1302, 1304 and 1306 will be fed from source A, stations 1308 and 1310 from source B, and station 1312 from source C. The plug or manual control valve 1320 would then be inserted between stations 1308 and 1310 and the plug 1322 between stations 1310 and 1312. In accordance with the discussion of positioning the manual switches above, the arm 1324 of switch 1314 is depicted in Position A and the arm 1326 of switch 1316 also is depicted in position A. Switch 1318 is also thrown to the "continue" position.

Since station 1304 is not the first station in line to be fed from source B, arm 1328 of switch 1330 is manually set to the "off" position. Arm 1332 of switch 1334 is set to position A and switch 1340 to the "continue" position since station 1304 is not the last to be fed from source A. Of the stations which are to be fed from source A, station 1306 is fed last, if it demands fibers, and so arm 1342 of switch 1344 is set to position "off" and arm 1346 of switch 1348 to position A. Switch 1350 is set to the "off" position. Since station 1308 is the first station fed from source B, arm 1352 of switch 1356 is set to the "B" position as is arm 1358 of switch 1360 to position B. Switch 1362 is also set to "continue." Since station 1310 is the station furthest to the right to be fed from source B, switch 1364 is set to the "end" position. Arm 1370 of switch 1372 is to the "off" position and arm 1380 of switch 1382 is set to position B. Since station 1312 is the only station which is to be fed from source C n this example, switch 1384 is set to the "end" position. Arm 1386 of switch 1388 is set to position C as is arm 1390 of switch 1392.

Assuming that the manual switches are in the positions shown, the operation of this embodiment will now be detailed. For the purposes of discussion, it will be assumed that all stations are demanding fiber. Of course, if will be appreciated that as soon as any of the stations demand fiber, the source which feeds that station will begin to do so and it is not necessary that all stations demand fiber before feeding begins.

In this schematic it will be assumed that a source of electrical potential is applied between $L_1$ and $L_2$ in each master control. It will be appreciated that all the $L_1$ terminals could be liked and all the $L_2$ terminals linked so that the potential would need to be applied to only one pair.

As in the embodiments discussed in connection with FIGS. 1–5, each of the sources is associated with a master control, master control 1400 with source A, master control 1402 with source B and master control 1404 with source C. The opening of level control switch 1406 interrupts the flow of current through coil 1408 of recycle relay 1410 in master control 1400 and coil 1412 of relay 1414 which lead through terminal $L_1$ of terminal block 1416, closed on-off switch 1418, normally closed switch 1420, lines 1421 and 1422, terminal 1 of terminal block 1416, lines 1424 and 1426, terminal 1A of terminal block 1430, line 1432, arm 1324, line 1434, level control switch 1406, line 1436, manual switch 1318, line 1438, terminal 3X of terminal block 1430, line 1440, level control switch 1442, line 1444, switch 1340, line 1446, terminal 3X of terminal block 1448, line 1450, level control switch 1452, line 1454, switch 1350, lines 1456 and 1458, arm 1346, line 1460, terminal 6A of terminal block 1462, lines 1464 and 1466, terminal 6 of terminal block 1416, lines 1468, coil 1412 and 1408, line 1470, terminal 2 of terminal block 1416, line 1472, and terminal $L_2$ of terminal block 1416. Terminal 2 of all terminal blocks are all connected together and are at the potential of $L_2$.

The interruption of current through coil 1412 closes normally closed switch 1474 and completes a current path through coil 1480 of feeder relay 1482 via on-off switch 1418,, line 1484, switch 1474, line 1468, closed on-off switch 1490, coil 1480, line 1470, terminal 2 of terminal block 1416, and line 1472. The passage of current through coil 1480 closes switch 1492, after a predetermined time delay, starting the feeding of fiber into conduit 1300 from source A in the same manner described in connection with FIGS. 1–5. The interruption of current through coil 1408 prevents the switch 1420 from opening and ends the periodic purging described below.

The closing of switch 1420 completes a current path through coil 1500, opening transition valve 1502 in the same manner as described in connection with FIG. 4. This path leads from terminal $L_1$ of terminal block 1416, through on-off switch 1418, closed switch 1420, line 1422, terminal 1 of terminal block 1416, lines 1424 and 1426, terminal 1A of terminal block 1430, line 1432, arm 1324 of switch 1314, line 1434, terminal 4 of terminal block 1504, line 1506, normally closed switch 1508, line 1538, terminal 7 of terminal block 1504, coil 1500, terminal 8 of terminal block 1504, line 1512, terminal 2 of terminal block 1504, and lines 1514 and 1472 to terminal $L_2$.

When level control switch 1406 closes indicating that station 1302 has received a sufficient amount of fiber, coil 1520 is connected, between terminal 2 of terminal block 1504 which is at the potential of $L_2$, and line 1434 which is at the potential of $L_1$ via level control switch 1406 and terminal 3 of terminal block 1504. The passage of current through coil 1520 opens switch 1508 and closes switches 1522 and 1524. The closing of switch 1524 completes an alternate path around level control switch 1406 so that current will pass through coil 1520 even if level control switch 1406 reopens. The opening of switch 1508 interrupts the current path through coil 1500 closing thereby the transition valve 1502.

The closing of level control switch 1406 completes a current path through coil 1530, opening valve 1532. This path leads from terminal 4 of terminal block 1504 which is at the potential of $L_1$ through level control switch 1406, terminal 3 of terminal block 1504, line 1436, switch 1318, line 1438, terminal 3X of terminal block 1430, line 1440, terminal 4 of terminal block 1533, line 1534, closed switch 1536, line 1538, terminal 7 of terminal block 1533, coil 1530, terminal 8, and line 1534 to terminal 2 of terminal block 1533 which is at the potential of $L_2$.

The closing of level control switch 1442, indicating that station 1304 has received a sufficient amount of fiber completes a current path through coil 1540 between line 1440 which is at the potential of $L_1$ and terminal 2 of terminal block 1532 which is at the potential of $L_2$ via level control switch 1442 and terminal 3 of terminal block 1533. The passage of current through coil 1540 opens switch 1536 and closes switches 1546 and 1548. The opening of switch 1536 then interrupts the current flowing through coil 1530, closing valve 1532.

The closing of switch 1442 completes a current path through coil 1560, opening valve 1562 so that station 1306 is now supplied with fibers. Current flows from line 1440 which is at the potential of $L_1$ through level control switch 1442, line 1444, switch 1340, line 1446, terminal 3X of terminal block 1448, line 1450, terminal 4 of terminal block 1562, line 1564, switch 1566, line 1568, terminal 7 of terminal block 1562, coil 1560, terminal 8 of terminal block 1562, and line 1570 to terminal 2 of terminal block 1562 which is at the potential of $L_1$.

Fibers then continue to be fed from source A to station 1306 until level control switch 1452 closes indicating that the need for additional fibers has ceased. The closing of switch 1452 then completes a current path through coil 1580 from terminal 3X of terminal block 1448, which is at the potential of $L_1$ through line 1450, switch 1452, terminal 3 of terminal block 1562, and coil 1580 to terminal 2 of terminal block 1562 which is at the potential of $L_2$. The passage of current through coil 1580 closes switches 1582 and 1584 and opens switch 1566.

Since station 1306 is the last station to be fed from source A, the stations fed from source A are now purged in the same manner as described in connection with FIGS. 1–6. The closing of level control switch 1452 completes the current path through coils 1408 and 1412 which was initially interrupted by the opening of level control switch 1406. The passage of current through coil 1412 opens switch 1474, interrupting the current path through coil 1480 and opening switch 1492. The opening of switch 1492 promptly causes source A to cease furnishing fibers as described above. The passage of current through coil 1408 opens switch 1420 but only after a predetermined period of time has elapsed.

Between the opening of switch 1492 and switch 1420, the system is purged. The closing of level control switch 1452 connects line 1450 which is at the potential of $L_1$ to terminal 6A of terminal block 1462 via line 1454, switch 1350, line 1458, arm 1346 and line 1460. Terminal 6A of terminal block 1462 is also connected to terminals 6A of terminal block 1430 and 1448 via lines 1570, 1572 and 1466. Terminal 6A of terminal block 1462 is also linked to terminal 6 of terminal block 1562 via line 1460, arm 1346, and line 1458. Similarly terminals 6A of terminal blocks 1430 and 1448 are connected to terminal 6 of terminal blocks 1504 and 1533, via lines 1580, arm 1326 and lines 1582 and 1584, arm 1332, and lines 1606 and 1608. Current now flows through coil 1560, opening valve 1562, from terminal 6A of terminal block 1462 through line 1460, arm 1346, lines 1458 and 1456, terminal 6 of terminal block 1562, line 1590, switch 1584, line 1568, terminal 7 of terminal block 1562, coil 1560, terminal 8 of terminal block 1562, and line 1570 to terminal 2 of terminal block 1562.

Similarly, valves 1502, and 1532 are simultaneously opened by the passage of current through coils 1500 and 1530. Current flows from terminal 6A of terminal 1430 through lines 1580, arm 1326, lines 1582 and 1584, terminal 6 of terminal block 1504, line 1602, switch 1522, line 1538, terminal 7 of terminal block 1504, coil 1500, terminal 8 of terminal block 1504 and line 1512 to terminal 2 of terminal block 1504. Current also flows from terminal 6A of terminal block 1448 through line 1604, arm 1332, lines 1606 and 1608, terminal 6 of terminal block 1532, line 1610, switch 1546, line 1538, terminal 7 of terminal block 1532, coil 1530, terminal 8 of terminal block 1532 and line 1534 to terminal 2 of terminal block 1533.

Switch 1420 opens after a predetermined time closing valves 1502, 1532, and 1562. If all of the level control switches 1406, 1442, and 1452 are closed then the system proceeds to purge itself. This purging is repeated until one of the level control switches opens whereupon the system operates in the above manner to satisfy the fiber demand.

Simultaneously and independently with source A, source B is satisfying the needs of the stations assigned to it. In the same manner as described in connection with the supply of stations 1302, 1304 and 1306 by source A, the opening of any of the level control switches of stations to be fed from source B, in this example switches 1620 and 1622 of station 1308 and 1310, interrupts the flow of current through coil 1630 of recycle relay 1632 and coil 1634 of relay 1636. The interruption of current through coil 1630 closes switch 1640, or allows switch 1640 to remain closed, and the interruption of current through coil 1634 closes switch 1644. The closing of switch 1644 completes a current path through coil 1650 of feeder relay 1652 via on-off switch 1654, line 1656, switch 1644, line 1660, on-off switch 1662, line 1664, terminal 2 of terminal block 1666 and line 1668. The passage of current through coil 1650 then closes switch 1670, after a delay of a few seconds, starting the feeding of fibers from source B into the conduit 1300 in the same manner as shown in FIG. 1.

The opening of switch 1452 then completes a current path through coil 1680, opening valve 1682 in the manner described in connection with FIG. 4. This path leads from $L_1$ through on-off switch 1654, switch 1640, terminal 1 of terminal block 1666, lines 1684 and 1686, arm 1352, line 1684, terminal 4 of terminal block 1686, line 1690, switch 1692, line 1694, terminal 7 of terminal block 1686, coil 1680, terminal 8 of terminal block 1686, line 1696, terminal 2 of terminal 1686, and lines 1700, 1704 and 1706 to terminal $L_2$.

The closing of level control switch 1620 indicating station 1308 has received sufficient fiber from source B, completes a circuit through coil 1710 from line 1684 which is at the potential of $L_1$ through level control switch 1620, terminal 3 of terminal block 1686, and coil 1710 to terminal 2 of terminal block 1686 which is at the potential of $L_2$. The passage of current through coil 1710 opens switch 1692, interrupting the passage of current through coil 1680 and closing valve 1682, and closes switches 1712 and 1714.

The closing of level control switch 1620 completes a current path through coil 1720, opening thereby valve 1722, from line 1684 which is at the potential of $L_2$ through level control switch 1620, line 1730, switch 1362, line 1734, terminal 3X of terminal block 1738, line 1740, terminal 4 of terminal block 1742, line 1750, switch 1752, line 1754, terminal 7 of terminal block 1742, coil 1720, terminal 8 of terminal block 1742, and line 1760 to terminal 2 of terminal block 1742 which is at the potential of $L_2$.

The level control switch 1622 closes whenever the fiber needs of station 1310 are satisfied, completing a path through coil 1762 which leads from line 1740 which is at the potential of $L_1$ through switch 1622, terminal 3 of terminal block 1742, and coil 1762 to terminal 2 of terminal block 1742 which is at the potential of $L_2$. The passage of current through coil 1762 opens switch 1752, interrupting the flow of current through coil 1720 and closing valve 1722 thereby, and closing switches 1780 and 1782.

Since station 1310 is the last station to be fed from source B the system is now purged. The closing of switch 1622 connects line 1740 which is at the potential of $L_1$ to terminal 6B of terminal block 1790 via line 1792, switch 1364, lines 1794 and 1796, arm 1390 and line 1800. A circuit is then completed from terminal 6B of terminal block 1790 through line 1802 and 1804, terminal 6 of terminal block 1666, and coils 1634 and 1630 to terminal 2 of terminal block 1666 which is at the potential of $L_2$. The passage of current through coil 1634 opens switch 1644, preventing the passage of current through feeder relay coil 1650 and opening switch 1670. The opening of switch 1670 prevents further feeding of fiber into the conduit 1300 by source B.

The passage of current through coil 1630 opens switch 1640, but only after a predetermined time has elapsed. Between when switch 1670 opens and when switch 1640 opens, valves 1682 and 1722 are opened by the passage of current through coils 1680 and 1720. Current flows from line 1740 which is at the potential of $L_1$ through switch 1622, lines 1792, 1794, and 1810, terminal 6 of terminal block 1742, line 1812, switch 1782, line 1754, terminal 7 of terminal block 1742, coil 1720, terminal 8 of terminal block 1742, and line 1760 to terminal 2 of terminal block 1742 which is at the potential of $L_1$. Current also flows from line 1740 through switch 1622, lines 1792 and 1796, arm 1390, line 1800, terminal 6A of terminal block 1790, lines 1802, 1804, and 1826, terminal 6B of terminal block 1738, line 1822, arm 1358, lines 1824 and 1826, terminal 6 of terminal block 1686, line 1830, switch 1714, line 1694, terminal 7 of terminal block 1686, coil 1680, terminal 8 of terminal block 1686 and line 1696 to terminal 2 of terminal block 1686. The opening of switch 1640 interrupts the current paths through coils 1720 and 1680 and the system now periodically repurges itself until level control switch 1620 or 1622 opens indicating a need for additional fiber.

While source A and B supply their stations, source C independently supplies the stations, in this example station 1312, which are assigned to it. The opening of level control switch 1840 interrupts the flow of current through coil 1850 closing switch 1852 of recycle relay 1854 and coil 1860 of relay 1864. The interruption of current through coil 1860 closes switch 1868 completing a current path through coil 1870 of feeder relay 1872 from $L_1$ through on-off switch 1874, line 1876, switch 1868, on-off switch 1876, coil 1870, and line 1878 to terminal 2 of terminal block 1880. The passage of current through coil 1870 closes switch 1882 after a short time delay and starting the feeding of fibers into conduit 1300 from source C.

The opening of switch 1840 also completes a current path through coil 1900. This path leads from $L_1$ through on-off switch 1874, switch 1852, terminal 1 of terminal block 1880, lines 1902 and 1904, terminal 1C of terminal block 1906, line 1908, arm 1384, line 1910, terminal 4 of terminal block 1918, line 1912, switch 1914, line 1916, terminal 7 of terminal block 1918, coil 1900, terminal 8 of terminal block 1918, and line 1920 to terminal 2 of terminal block 1918 which is at the potential of $L_2$. The passage of current through coil 1900 opens valve 1926 so that station 1312 can be supplied from source C.

When switch 1840 closes, indicating that station 1312 has received sufficient fibers, current flows through coil 1930 from line 1910 which is at the potential of $L_1$ through switch 1840, terminal 3 of terminal block 1918 and coil 1930 to terminal 2 of terminal block 1918 which is at the potential of $L_2$. The passage or current through coil 1930 closes switches 1940 and 1942 and opens switch 1914.

Since station 1312 is the only station supplied by source C in this example, the closing of switch 1840 initiates the purging of the system associated with source C. A circuit is now established through coils 1850 and 1860 from line 1910 through switch 1840, line 1950, switch 1385, lines 1956 and 1958, arm 1390, line 1962, terminal 6C of terminal block 1906, lines 1966 and 1968, terminal 6 of terminal block 1880, and coils 1854 and 1860 to terminal 2 of terminal block 1880. The passage of current through coil 1860 opens switch 1868 interrupting the current path through coil 1870. The interruption of current through coil 1870 opens switch 1882 halting the feeding of fiber into conduit 1300 by source C. The switch 1852 delays for a few seconds in opening during which valve 1926 is held open by a circuit completed through coil 1900 from line 1910 which is at the potential of $L_1$ through switch 1385, lines 1926 and 1970, terminal 6 of terminal block 1918, line 1980, switch 1942, line 1916, terminal 7 of terminal block 1918, coil 1900, terminal 8 of terminal block 1918 and line 1920 to terminal 2 of terminal block 1918. After switch 1852 opens, the system purges itself repeatably until the lever control switch 1840 opens indicating a need for further fiber.

I claim:

1. In a material distributing system for use with a plurality of material sources and a plurality of stations to be fed from said sources, the improvement comprising:
    suction conveyor means connecting said sources to said stations including means connecting a first number of said stations to one of said sources, and a second number of said stations to a second one of said sources, with a given number of the stations in said first and second numbers thereof being connected by said conveyor means to both said one and second sources,
    means for selecting from said given number of said stations a respective predetermined number thereof to be fed by said sources mutually exclusively so that only one source can be used at a time to feed any given station, and
    control means including electrical control means for feeding source material via said conveyor means to said stations in accordance with said selection by said selecting means.

2. In a system as in claim 1 wherein said means for selecting a predetermined number of said stations includes selecting switches.

3. In a material distributing means as in claim 1 wherein said selection means comprise insertable circuit plugs.

4. In a system as in claim 1 including circuit means for feeding the furthest receiving station away from said plurality of material sources first and continuing serially to the nearest of said material sources.

5. A system as in claim 1 including control means for preventing the feeding of stations furthest away while the closer stations to the material supply sources are being filled.

6. A system as in claim 1 wherein said means for feeding source material can feed the predetermined number of selected stations concurrently from the respective material sources.

7. A system as in claim 1 including valve cutoff means for said conveyor means whereby material can be conveyed from one of said material sources to one of said stations indicating demand for said material without interference from material being conveyed to another receiving station from another material source.

8. In a system as in claim 1 including means associated with each said station having a first electrical condition indicating demand for said fibers and a second electrical condition indicating no demand for said fibers, and wherein said control means includes means associated with each said source for checking one at a time and in a given sequence the demand indicating means of each of the stations fed by that source and for feeding until the associated demand indicating means indicates no demand, each of the stations checked, which, when checked, had an associated demand indicating means indicating demand, before checking the next demand indicating means in said given sequence.

9. In a system as in claim 8 wherein said control means includes circuit means associated with each said source for purging said conveying means of excess material after said checking and feeding means associated with that source has checked all of the stations fed by that source and fed those sources having demand indicating means indicating a demand position when checked.

10. In a material extracting system of the type having pneumatic means for conveying material to a plurality of stations, means at each of said stations for indicating demand or no demand of said material, and actuable distributor means at each station for extracting said material from said conveying means when actuated, the improvement comprising:
    a plurality of material supply source means, connected to said conveying means so that at least a single station can be served by more than one of said source means, for concurrently providing material to be distributed to said stations,
    first electrical control means responsive to the station demand indicating means for controlling actuation of the respective distributor means in accordance therewith so that each source distributes material to at most one station at any one time, and
    second electrical control means for selectively determining from which of said source means material is distributed to each of said stations which can be served from more than one of said source means upon respective demand therefrom.

11. A system as in claim 10 wherein said second electrical control means are a plurality of selecting switches.

12. A system as in claim 10 wherein said first electrical control means responsive to station demand serially controls the feeding operation to the preselected number of stations.

13. A system as in claim 10 wherein said first electrical control means responsive to station demand indicating means controls the serial feeding of said preselected number of stations whereby the furthest station from the material supply source is fed first and the closest is fed last.

14. A system as in claim 10 including third control means for preventing the feeding of stations furthest away while the closer stations to the material supply sources are being filled.

15. In a material distributing system of the type having means for conveying material to a plurality of stations, means at each of said stations for indicating demand or no demand of said material, and actuable means at each station for extracting said material from said conveying means when actuated, the improvement comprising:
    a plurality of material supply means for concurrently providing material to be distributed to said stations at a selectively determined sequence,
    first electrical control means for selectively determining a respective number of stations to be filled from each of said material supply means,
    second electrical control means responsive to the station demand indicating means for controlling actuation of the respective extracting means at each of said stations in accordance to the demand indicated, and
    sequencing means serially controlling said second control means whereby demand will be serially fulfilled after the selection of a series of stations to be filled from each supply means is made.

16. A system as in claim 15 wherein said second electrical control means responsive to the station demand indicating means controls the feeding of the station furthest away and feeding the next closest et seriatim.

17. A system as in claim 15 wherein two of said plurality of material supply means are remotely located from each other at the ends of said conveying means and wherein said first electrical control means determines which of said selected number of stations is to be fed by which of said remotely located sources.

18. A system as in claim 17 including valve cutoff means for said conveyor means whereby material can be conveyed from one of said sources to said number of preselected stations without interference from material being conveyed to other stations from said other material source.

19. In a material distributing system,
a plurality of material sources,
a plurality of receiving stations to be fed from said sources and having actuable transition valves,
suction conveying means connecting each of said sources to each of said receiving stations,
means for selecting a predetermined number of receiving stations to be fed by each of said sources so that only one source is selected to feed any given number of stations,
means for concurrently feeding source material from said sources to said receiving stations so that each said source feeds at most one station at any given time in accordance with said selection by said selecting means,
means for purging said conveying means at the completion of said feeding,
means for automatically determining the sequence of feeding the number of selected stations from the respective material source, and
means for indicating demand or no demand at each of said receiving stations whereby each station can be filled upon demand through said actuable transition valves.

20. In a material distributing system for use with a plurality of material sources and a plurality of stations to be fed from said sources, the improvement comprising:
pneumatic conveyor means connecting said sources to said stations including pneumatic means connecting a first number of said stations to one of said sources, and a second number of said stations to a second one of said sources, with a given number of the stations in said first and second numbers thereof being connected by said conveyor means to both said one and second sources,
means for selecting from said given number of said stations a respective predetermined number thereof to be fed by said sources mutually exclusively so that only one source can be used at a time to feed any given station, and
control means including electrical control means for feeding source material via said conveyor means to said stations in accordance with said selection by said selecting means.

21. A system as in claim 19 including valve cutoff means for said conveying means whereby material can be conveyed from one of said material sources to one of said stations indicating demand for said material without interference from material being conveyed to another receiving station from another material source.

22. A system as in claim 19 wherein said selecting means is a stepping switch with a plurality of positions where each position determines the number of said receiving stations fed from each said plurality of material sources.

23. A system as in claim 19 wherein said plurality of material sources are remotely located from each other and from said receiving stations.

24. A system as in claim 19 wherein said plurality of material sources are two in number and are remotely located from each other at the end of said vacuum conveying means, whereby a number of stations are fed by one of said sources according to the predetermined selection.

25. A system as in claim 19 wherein said selecting means includes a plurality of switches associated with each said station which can be fed from more than one of said sources, the positions of said plurality of switches determining the stations fed from each said source.

26. A system as in claim 25 wherein said plurality of switches are ganged.

27. A system as in claim 26 wherein said ganged switches are adapted to be manually operated.

28. A system as in claim 25 wherein said plurality of switches comprises three manually operated switches at least one of which has a position indicating the source which feeds that station.

29. A system as in claim 28 including at least three sources.

30. A system as in claim 25 including a number of stepping switches equal to the number of stations which can be fed from more than one of said sources having a plurality of positions which determine the stations fed from each said source.

31. In a material distributing system,
a plurality of material sources,
a plurality of receiving stations to be concurrently fed from said sources and having transition valves, at least one of said stations being adapted to change the source which feeds it,
means associated with each said source for feeding source material to stations having open transition valves,
suction conveying means connecting each of said sources to each of said receiving stations,
a level control switch associated with each said station having a demand and a no-demand position,
a plurality of switches associated with each said changeable station, each of said switches having a position indicating the source which feeds that station,
a valve relay associated with each said station which is adapted to open the transition valve associated with that station, and
a master control circuit associated with each said source, said control circuit being adapted to connect to said switches, said control circuit causing said valve relays to sequentially open said transition valves of all said stations to be fed from that source which have a level control switch in a demand position with the result that each said changeable station will be fed by the source indicated by the position of the switches of that changeable station.

32. A system as in claim 31 wherein said feeding means includes a motor adapted to be energized to cause the feeding of said source material from a given source and a feeder relay circuit adapted to close a switch energizing said motor whenever any of the level control switches of any of the stations fed by the given source are in a demand position.

33. A system as in claim 32 including purging means associated with each said source comprising a recycle relay circuit which operates to hold all of the transition valves of all of the stations fed from a given source open for a predetermined length of time after all of said stations with a level control switch in a demand position have been fed and to prevent said feeding means from operating during said predetermined length of time.

34. A system as in claim 33 wherein said plurality of switches are ganged and manually operable.

35. A system as in claim 33 wherein said plurality of switches comprises three manually operable switches.

36. A system as in claim 35 including at least three sources.

37. A system as in claim 33 wherein said plurality of switches are stepping switches, the number of stepping switches being equal to the number of changeable stations and the number of steps in each said stepping switches being equal to the number of desired combinations of stations and sources.

38. A method for distributing material from a plurality of material sources to a plurality of stations by pneumatic conveying means which connects a given number of said stations to each of said sources, comprising the following steps:
selecting from said given number of stations a respective predetermined number thereof to be fed by said sources mutually exclusively so that only one source can be used at a time to feed any given station, and feeding material concurrently from said sources to each of said selected stations so that each said source distributes fibers to only one station at a time in accordance with the previously made selection.

39. A method as in claim 38 wherein the step of selecting said stations is such that at least one station is selected to be fed from one source and at least one other station is selected to be fed from another source and wherein the said feeding of the selected stations is from the said one and another sources concurrently as aforesaid.

40. A method for distributing material from a plurality of material sources to a plurality of stations by pneumatic conveying means which connects at least one of said stations to each of said material sources, comprising the steps of:
   selecting one of said sources as the source of material from said one station, and then
   sequentially feeding a plurality of said stations, including said one station, from the selected one source.

41. A method as in claim 40 wherein the said feeding of each of said plurality of stations from said one source is dependent upon the respective demand of the station in question.

42. A method as in claim 40 wherein the feeding of said plurality of stations from said one source is effected serially in a predetermined order.

43. A method for distributing material from a plurality of material sources to a plurality of stations by pneumatic conveying means which connects at least one of said stations to each of said material sources, comprising the steps of:
   selecting one of said sources as the source of material from said one station, and then
   feeding a plurality of said stations, including said one station, from the selected one source while feeding other stations from another said material source.

* * * * *